United States Patent
Keller, III et al.

(10) Patent No.: US 10,235,523 B1
(45) Date of Patent: Mar. 19, 2019

(54) AVIONICS PROTECTION APPARATUS AND METHOD

(71) Applicant: NOKOMIS, INC., Charleroi, PA (US)

(72) Inventors: Walter J. Keller, III, Bridgeville, PA (US); Andrew Portune, Oakdale, PA (US)

(73) Assignee: NOKOMIS, INC., Charleroi, PA (US)

( * ) Notice: Subject to any disclaimer, the term of this patent is extended or adjusted under 35 U.S.C. 154(b) by 112 days.

(21) Appl. No.: 15/152,307

(22) Filed: May 11, 2016

Related U.S. Application Data

(60) Provisional application No. 62/334,344, filed on May 10, 2016.

(51) Int. Cl.
| | |
|---|---|
| *G06F 21/00* | (2013.01) |
| *G06F 21/56* | (2013.01) |
| *G06F 21/57* | (2013.01) |
| *G06F 13/42* | (2006.01) |

(52) U.S. Cl.
CPC ........ *G06F 21/564* (2013.01); *G06F 13/4282* (2013.01); *G06F 21/577* (2013.01)

(58) Field of Classification Search
None
See application file for complete search history.

(56) References Cited

U.S. PATENT DOCUMENTS

| | | | | |
|---|---|---|---|---|
| 5,992,290 | A * | 11/1999 | Quebedeaux | F41G 7/007 89/1.51 |
| 10,051,483 | B2 * | 8/2018 | Barzegar | H04B 7/0617 |
| 2005/0020256 | A1 | 1/2005 | Peikari | |
| 2005/0046584 | A1 * | 3/2005 | Breed | B60C 11/24 340/13.31 |
| 2006/0082488 | A1 | 4/2006 | Keller, III | |
| 2008/0102797 | A1 | 5/2008 | Coleman et al. | |

(Continued)

OTHER PUBLICATIONS

Sankar, Lalitha et al. The Role of Signal Processing in Meeting Privacy Challenges. IEEE Signal Processing Magazine, vol. 30, Issue: 5. https://ieeexplore.ieee.org/stamp/stamp.jsp?tp=&arnumber=6582707 (Year: 2013).*

(Continued)

*Primary Examiner* — Jeremiah L Avery
(74) *Attorney, Agent, or Firm* — AP Patents

(57) ABSTRACT

An apparatus for a network of electrical and/or electronic devices coupled to a data bus comprises a sensor coupled to the data bus and configured to capture information content communicated through the data bus in a form of electromagnetic emissions being at least one of differential mode electromagnetic emissions, common mode electromagnetic emissions, coupled radiated electromagnetic emissions, and data bit streams; one or more processors or logic devices, and a non-transitory computational medium comprising executable instructions. The apparatus measure a feature value in at least one region of a time domain or a frequency domain of the captured electromagnetic emissions, calculates a difference value between the measured feature value and one or more baseline feature values, and determines, based on the calculated value, a presence or an absence of anomalies indicative of at least one of cyber intrusion attempt, cyber attack, cyber-physical attacks, malware, etc.

21 Claims, 13 Drawing Sheets

(56) References Cited

U.S. PATENT DOCUMENTS

| | | | |
|---|---|---|---|
| 2008/0292146 A1* | 11/2008 | Breed | B60N 2/002 |
| | | | 382/118 |
| 2010/0123453 A1 | 5/2010 | Pauly et al. | |
| 2010/0162392 A1 | 6/2010 | Jeong et al. | |
| 2010/0180350 A1 | 7/2010 | Glaubert | |
| 2010/0332475 A1* | 12/2010 | Birdwell | G06F 17/30333 |
| | | | 707/737 |
| 2011/0202208 A1 | 8/2011 | Karnik et al. | |
| 2011/0320170 A1 | 12/2011 | Pathak et al. | |
| 2012/0143557 A1 | 6/2012 | Moliere et al. | |
| 2012/0179812 A1 | 7/2012 | Keller, III | |
| 2012/0223403 A1* | 9/2012 | Keller, III | H01L 23/576 |
| | | | 257/428 |
| 2013/0229310 A1 | 9/2013 | Parks et al. | |
| 2013/0314258 A1 | 11/2013 | Lyons et al. | |
| 2015/0241493 A1 | 8/2015 | Canne et al. | |
| 2015/0350914 A1* | 12/2015 | Baxley | H04W 12/08 |
| | | | 726/11 |
| 2016/0098561 A1* | 4/2016 | Keller | G06F 21/554 |
| | | | 726/24 |
| 2016/0112083 A1 | 4/2016 | Keller, III et al. | |
| 2016/0124041 A1 | 5/2016 | Pathak et al. | |
| 2016/0127931 A1* | 5/2016 | Baxley | G01S 5/0263 |
| | | | 455/67.16 |
| 2016/0132416 A1 | 5/2016 | Shirakawa et al. | |
| 2016/0133111 A1 | 5/2016 | Shirakawa et al. | |

OTHER PUBLICATIONS

Wei, Mingkui; Wang, Wenye. Greenbench: A Benchmark for Observing Power Grid Vulnerability Under Data-Centric Threats. IEEE INFOCOM 2014—IEEE Conference on Computer Communications. https://ieeexplore.ieee.org/stamp/stamp.jsp?tp=&arnumber=6848210 (Year: 2014).*

Sharp, David C. et al. Challenges and Solutions for Embedded and Networked Aereospace Software Systems. Proceedings of the IEEE, vol. 98, Issue: 4. https://ieeexplore.ieee.org/stamp/stamp.jsp?tp=&arnumber=5437167 (Year: 2010).*

* cited by examiner

AVIONICS PROTECTION APPARATUS AND METHOD

CROSS-REFERENCE TO RELATED APPLICATIONS

This patent application is related to and claims priority from U.S. Provisional Patent Application Ser. No. 62/334,344 filed May 10, 2016 and its disclosure is being incorporated in its entirety into this document by reference thereto.

This document incorporates by reference the disclosures and/or teachings of the following documents: U.S. Pat. No. 7,515,094 ("Advanced electromagnetic location of electronic equipment"); U.S. Pat. No. 8,063,813 entitled "Active improvised explosive device (IED) electronic signature detection"; U.S. Pat. No. 8,537,050 entitled "Identification and analysis of source emissions through harmonic phase comparison"; U.S. Pat. No. 8,643,539 entitled "Advance manufacturing monitoring and diagnostic tool"; U.S. Pat. No. 8,825,823 entitled "System and method for physically detecting, identifying, diagnosing and geolocating electronic devices connectable to a network"; US Pub 20100123453 entitled "ADVANCED MANUFACTURING MONITORING AND DIAGNOSTIC TOOL"; US Pub. 20110320170 entitled "METHOD AND APPARATUS FOR THE DIAGNOSIS AND PROGNOSIS OF ACTIVE IMPLANTS IN OR ATTACHED TO BIOLOGICAL HOSTS OR SYSTEMS"; US Pub. 20120179812 entitled "SYSTEM AND METHOD FOR PHYSICALLY DETECTING, IDENTIFYING, DIAGNOSING AND GEOLOCATING ELECTRONIC DEVICES CONNECTABLE TO A NETWORK"; US Pub. 20120223403 entitled "INTEGRATED CIRCUIT WITH ELECTROMAGNETIC ENERGY ANOMALY DETECTION AND PROCESSING"; US Pub. 20120226463 entitled "SYSTEM AND METHOD FOR PHYSICALLY DETECTING COUNTERFEIT ELECTRONICS"; US Pub. 20130229310 entitled "SYSTEM AND METHOD FOR GEO-LOCATING AND DETECTING SOURCE OF ELECTROMAGNETIC EMISSIONS"; U.S. Pub. Ser. No. 01/009,5934 entitled "IDENTIFICATION AND ANALYSIS OF SOURCE EMISSIONS THROUGH HARMONIC PHASE COMPARISON"; US Pub. 20130328710, entitled "Method and Apparatus for Detection and Identification of Counterfeit and Substandard Electronics"; U.S. Ser. No. 13/106,412 entitled "Method and Apparatus for the Diagnosis and Prognosis of Active Implants in or Attached to Biological Hosts or Systems"; U.S. Ser. No. 13/344,717 entitled "System and Method for physically detecting, identifying, diagnosing and geolocating electronic devices connectable to a network"; U.S. Ser. No. 13/410,586 entitled "System and Method for Geolocating and Detecting Source of Electromagnetic Emissions"; U.S. Ser. No. 13/410,797 entitled "System and Method for Physically Detecting Counterfeit Electronics"; U.S. Ser. No. 13/410,909 entitled "Integrated Circuit with Electromagnetic Energy Anomaly Detection and Processing"; U.S. Ser. No. 13/712,031 entitled "Method and Apparatus for battle damage assessment of electric or electronic devices"); U.S. Ser. No. 14/199,687 entitled "Method and Apparatus for Detection and Identification of Counterfeit and Substandard Electronics", U.S. Ser. No. 14/141,653 entitled "Advance Manufacturing Monitoring and Diagnostic Tool"; PCT/US2015/014765 entitled "METHOD AND APPARATUS FOR DETECTION AND IDENTIFICATION OF COUNTERFEIT AND SUBSTANDARD ELECTRONICS", U.S. Ser. No. 14/329,160 entitled "System and Method for Physically Detecting, Identifying, Diagnosing and Geolocating Electronic Devices Connectable to a network", and U.S. Ser. No. 14/663,156, filed Mar. 19, 2015 entitled "DETECTION OF MALICIOUS SOFTWARE, FIRMWARE, IP CORES AND CIRCUITRY VIA UNINTENTIONAL EMISSIONS".

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to avionics protection. It further relates to monitoring and diagnosing device health and operational status connected to an electronics data bus. The subject matter may relate to protection of electronic systems connected to a data bus or network. The subject matter may relate to avionics protection from cyber and cyber-physical attacks.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present subject matter, or any embodiments thereof, to anything stated or implied therein or inferred thereupon.

Complex avionics are critical to the performance of aircraft systems and their flight success. Adversarial intrusion or subversion of avionics' software and hardware jeopardizes flight assurance, passenger lives, and national or passenger security.

To ensure flight safety and mission success, the user, operator or manufacturer of the aircraft can have an immediate need for a capability to verify the trustworthiness of critical avionics, embedded software, hardware, and methods to mitigate vulnerabilities or threats. Furthermore, the operator has a need to be able to detect cyber intrusion events or cases where electronic assets have been compromised or subverted by at least a cyber attack or a cyber physical attack.

BRIEF DESCRIPTION OF THE DRAWINGS

The accompanying drawings are incorporated in and constitute part of the specification and illustrate various embodiments. In the drawings.

LISTING OF THE EXEMPLARY ELEMENTS

Figure 1:
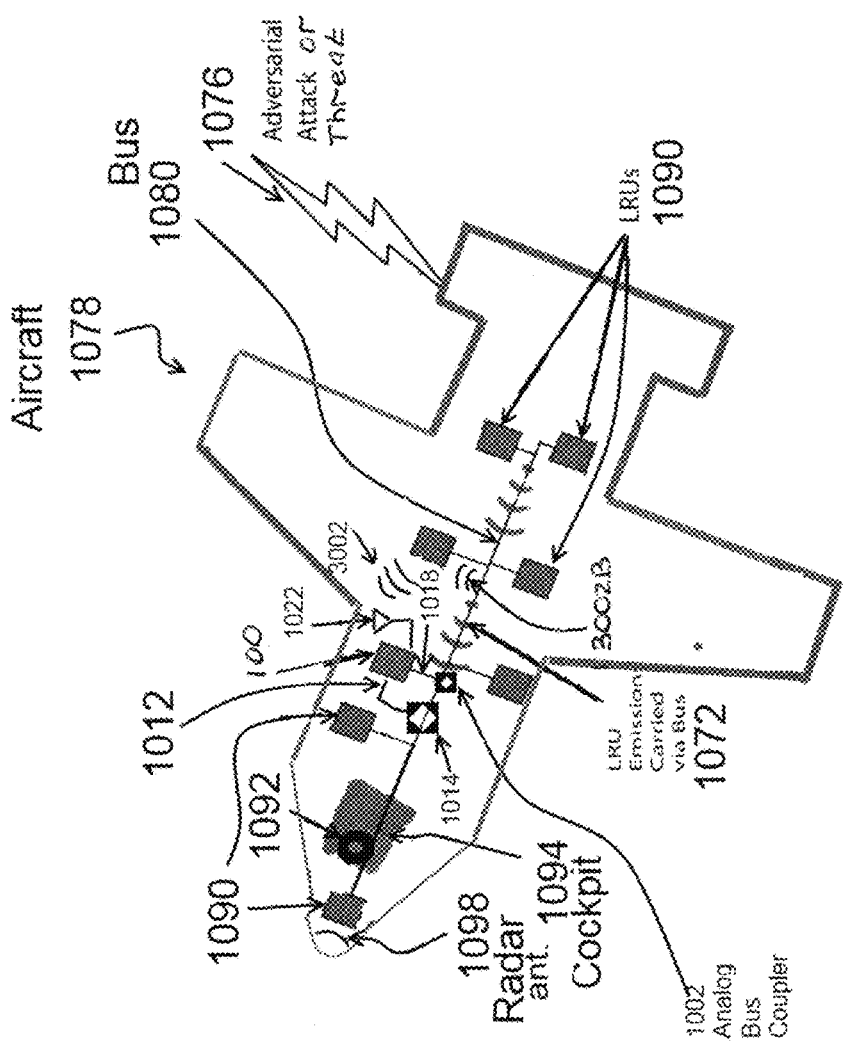
FIG. 1 illustrates an embodiment of operation of the avionics protection apparatus.
Figure 2:
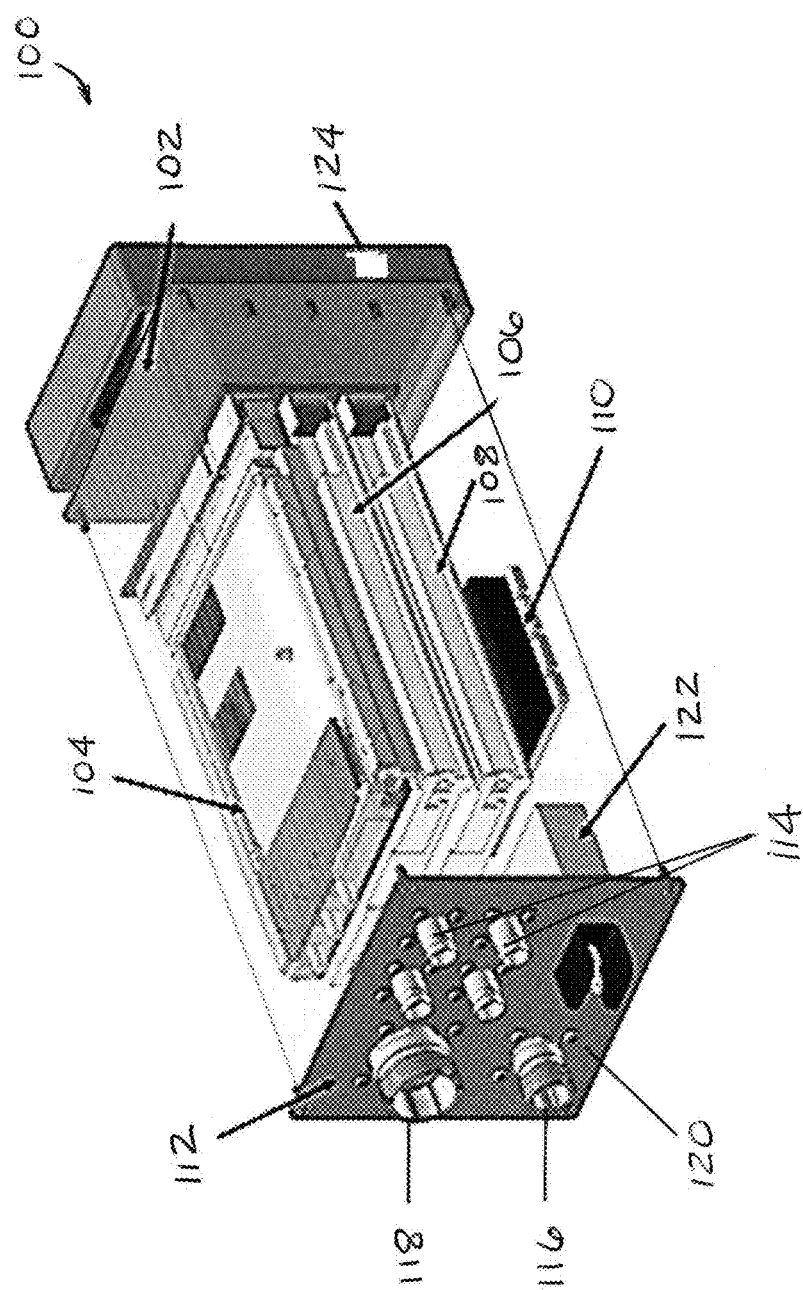
FIG. 2 illustrates an exemplary embodiment of the avionics protection apparatus.
Figure 3:
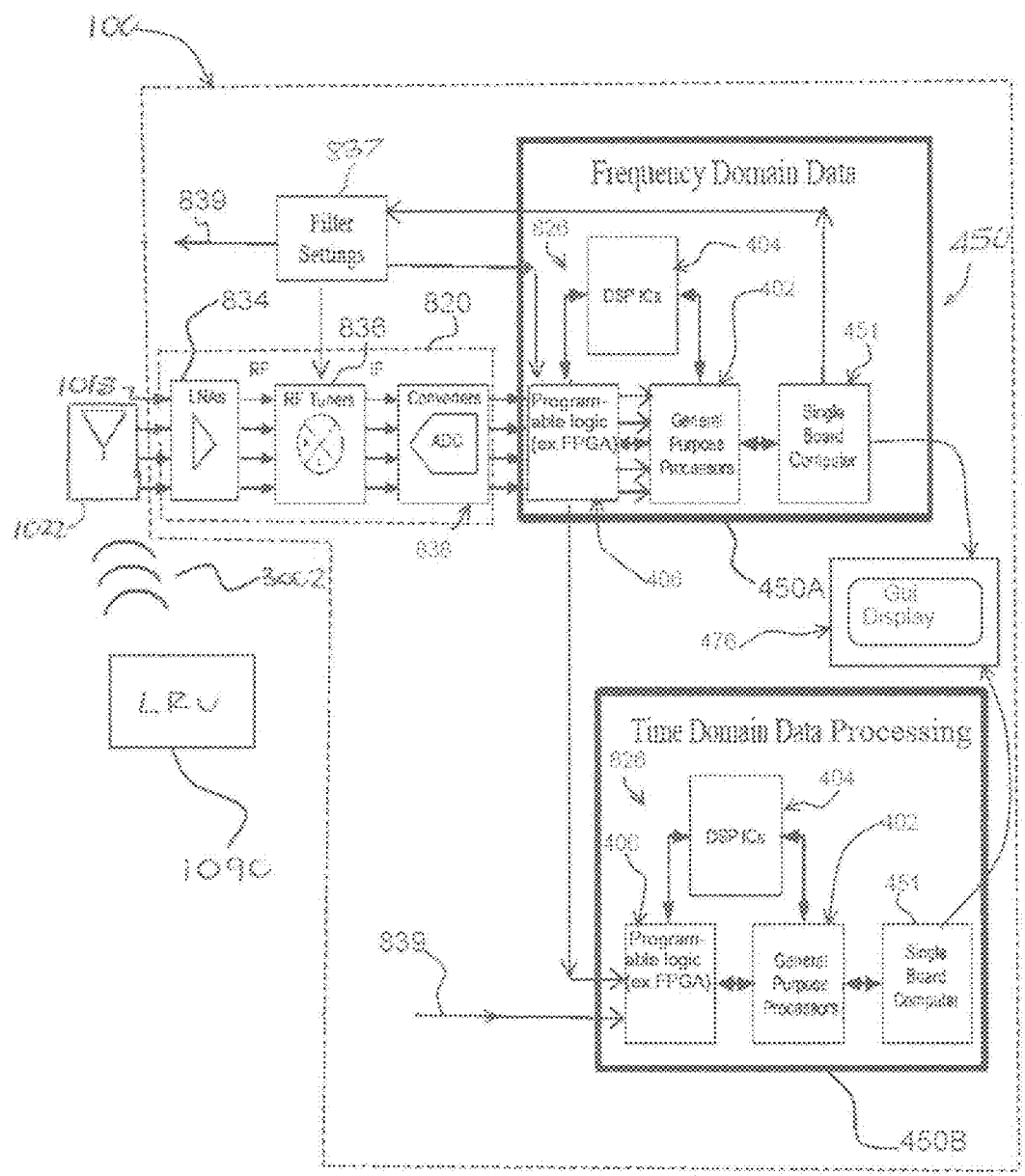
FIG. 3 illustrates a schematic embodiment of a data bus coupler device and the data bus emitting RF unintended emissions, being receivable by an antenna.
Figure 4:
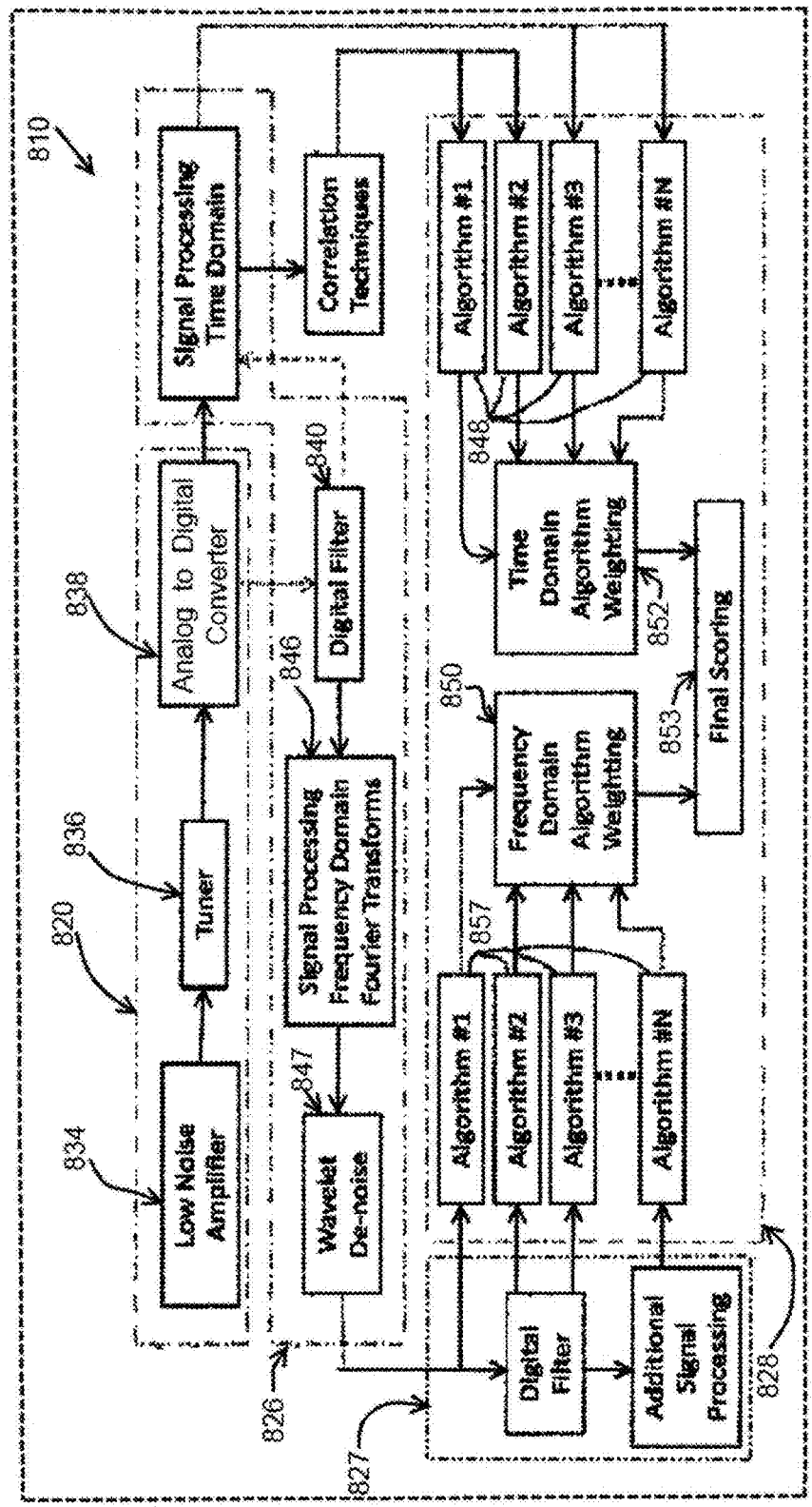
FIG. 4 illustrates detailed software and hardware components of the apparatus of FIGS. 2-3.
Figure 5:
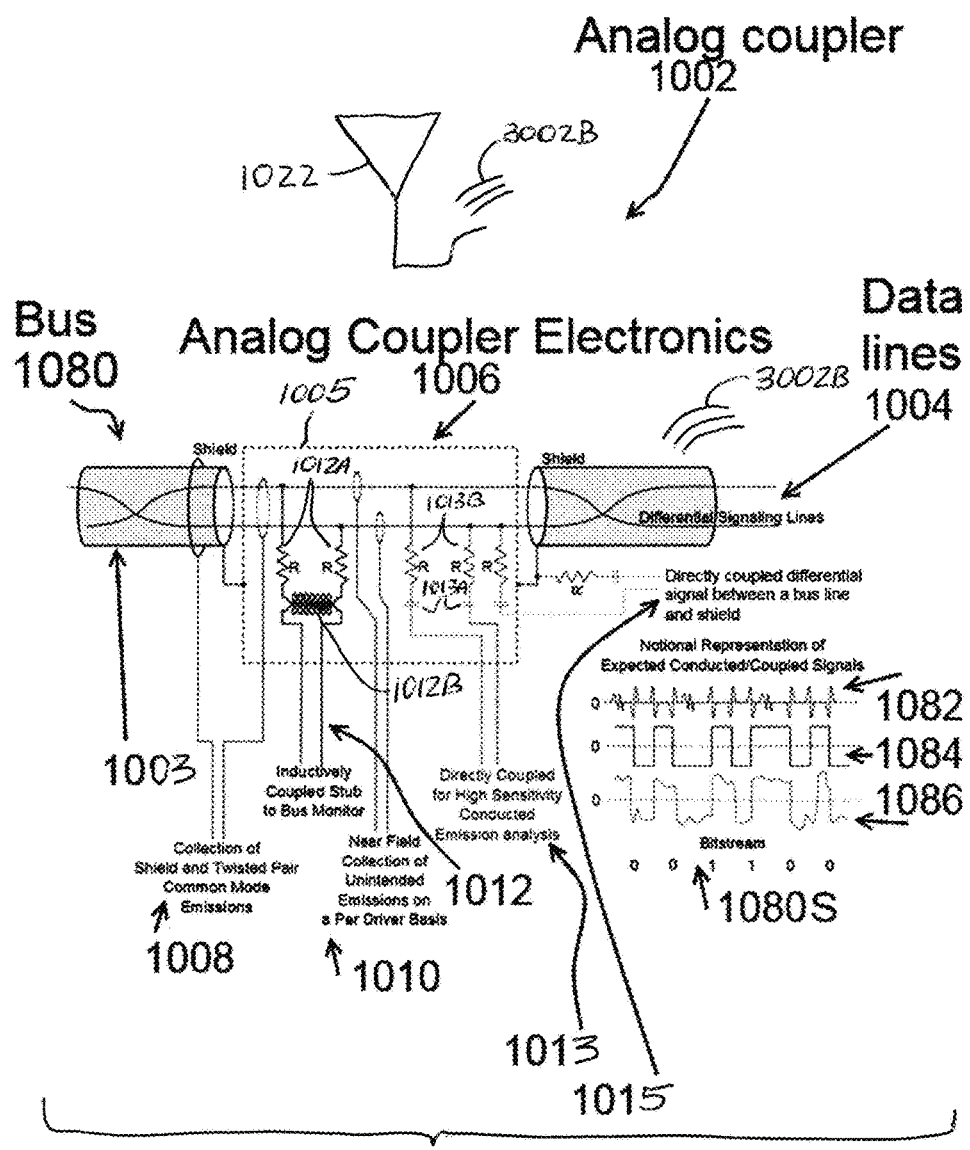
FIG. 5 illustrates a schematic embodiment of a data bus coupler device.
Figure 6:
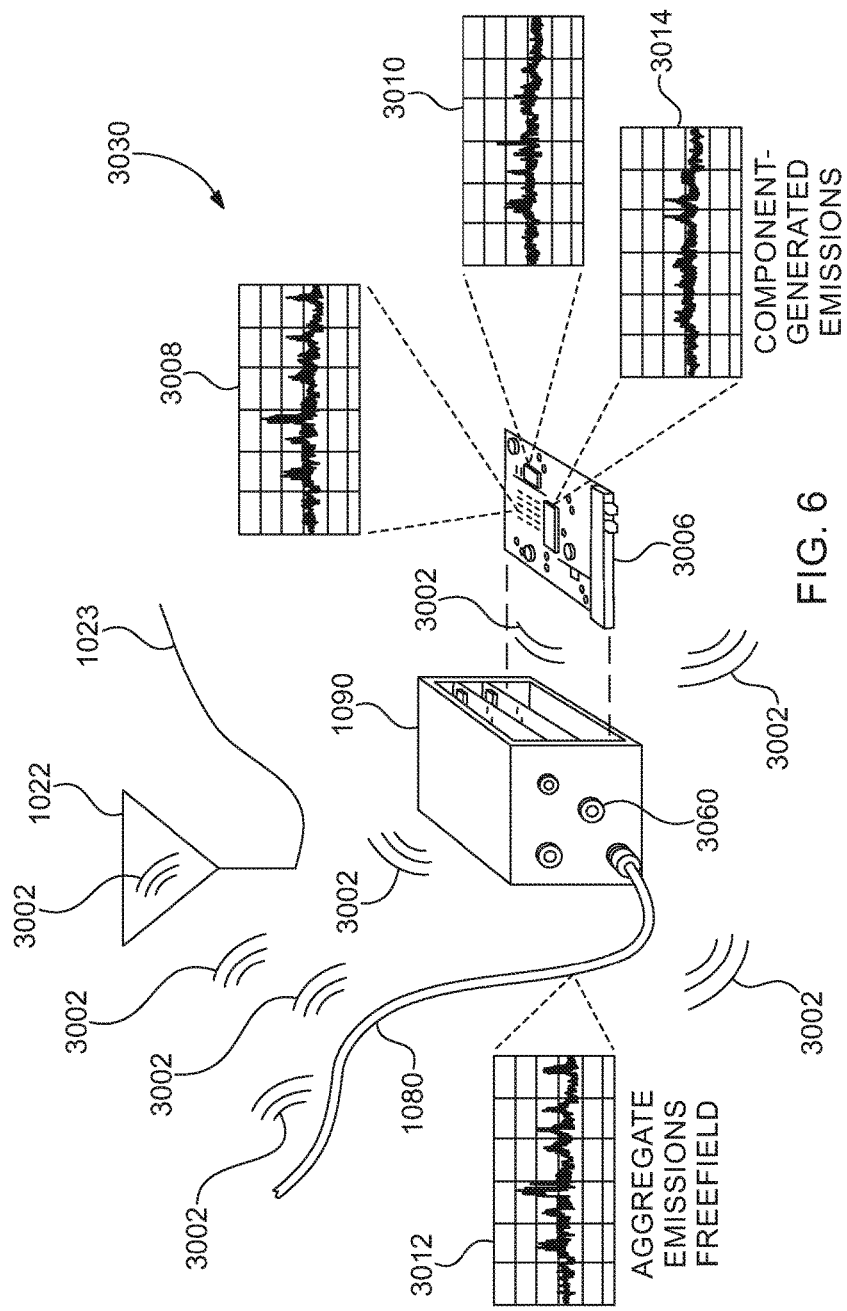
FIG. 6 illustrates an exemplary remote protection of LRUs through intended or unintended emissions.

FIG. 1
100—Apparatus that detects changes in emissions based on intended and unintended emissions
1002—Analog Bus Coupler coupling to analog signal content of bus containing mechanical and electrical interfacing means and supporting components
1012—Data bus from BUS MONITOR AND ARBITRATOR (1014) going to the apparatus (100)
1014—BUS MONITOR AND ARBITRATOR device interfacing between 100 and digital signals on bus
1018—Analog signal cable(s) connecting 1002 to 100
1022—Antenna collecting radiated emissions from BUS, LRUs, LRU boards, and/or other equipment on board for delivery to 100
1072—emission from LRU carried or conducted by bus
1076—attack, unintended modification, wanted or unwanted change being applied to one or more LRUs or to their interconnecting bus
1078—aircraft, vehicle, structure or housing containing bus and electronic devices communicating via bus
1080—data bus connecting LRUs together for communication between them
1090—LRUs
1092—system status indicator to pilot in cockpit, status from apparatus 100
1098—radar antenna typically connected to a radar LRU comprising a critical subsystem of interest to be typically monitored
1094—airplane cockpit containing user, pilot, operator and/or system status indictor 1092 observer
3002—free field emissions from LRUs, LRU boards, and possibly bus
3002B—free field emission from bus FIG. 2
100—apparatus
102—chassis
104—digital bus communications and digital analysis board. 104 may be combined and or contained in 106/108
106 and 108—unintended and/or intended emissions analysis boards
110—power supply
112—panel containing and supporting I/O interface connectors for 100
114—misc. connectors for dedicated diagnostic computer interface, computer interface, signals or communication to outside world, power, air temperature, pressure, battery level, battery backup, system status indicator
116—digital signal cable connector to interface to cable 1012 containing digital data
118—analog signal cable input connector to interface to cable
120—front of 100 containing electronic interfaces
122—Transceiver circuit for bus digital communication and interface
124—Forced air conduction cooling fan
1018 containing analog emissions data
1092, other external sensors, and/or other annunciators FIG. 3
402—processor typically containing more complex dedicated algorithms for emissions analysis
404—DSP chip performing math operations on digitized data efficiently to assist or instead of FPGA (optional)
406—FPGA processing element typically containing FFT transform, FIR Filtering, other time domain and frequency domain manipulation functions
450A—frequency domain processing subsystem for analyzing emissions in frequency domain
450B—time domain processing subsystem for analyzing emissions in time domain (optional)
451—Single board computer (SBC) typically performing additional high level analysis, control and response functions
476—optional operator/user Gui display or status indicator
826—digitized signal preparation, extraction, conversion components
834—LNA used to amplify low level analog emissions signals from antenna(s) or Bus
836—tuner to select and convert emissions frequencies to a different frequency for lower or more appropriate speed operations of ADC and processing elements
838—Analog to digital converter to convert analog emissions signals to digitized data
839—Optional filter control settings lines to establish preselection of wanted signals (such as bandpass) or prefiltering out of unwanted signals (such as band reject, lowpass and/or highpass), typically to prevent ADC clipping and associated noise generation FIG. 4
820—analog domain front end, all other elements remainder being digital
826—signal processing operations, domain conversion and filtering typically done in a dedicated FPGA or ASIC
827—additional frequency domain filtering (optional)
848—time domain emission feature and signature analysis comparison and discrimination algorithms (typically optional but used for specialty or deeper analysis in the time domain)
850—weighing and evaluating individual contributions from separate frequency domain evaluation algorithms (857s)
852—weighing and evaluating individual contributions from separate time domain evaluation algorithms (857s)
853—result determination which may be acted upon, possibly sending mitigation response, and/or logged
857—frequency domain emission feature and signature analysis comparison and discrimination algorithms FIG. 5
1003—data bus shielding
1004—data bus individual cabling lines, typically differential signaling, twisted pair 1006—electronics associated with emissions analog coupler electronics
1005—EMI/RF shielding around electronics components of 1002
1008—collection of shield and twisted pair common mode emissions, can be inductive near field pickup as example
1010—near field collection of emissions on a per driver or per data line basis
1012—Inductively coupled stub to bus monitor
1012A—interface components to attach electrically to bus while ensuring proper impedance matching—inductive and transformer based for acquisition of analog emissions signals
1012B—inductive transformer for coupling signal, impedance matching and DC isolation of bus from 100
1013—directly coupled emissions tap for high sensitivity, and/or higher frequency emissions analysis, typically capacitive, typically high input impedance, generating differential voltage between the bus lines
1013A—DC isolation Capacitors
1013B—coupling resistors to ensure high impedance input or alternatively a correct impedance matching
1015—directly coupled emissions tap for high sensitivity, and/or higher frequency emissions analysis, typically capacitive, typically high input impedance, generating differential voltage between a bus line and the shield
1080S—waveforms representing bus signals or generated by bus
1082—signals for analysis and/or extraction acquired thru a very low value capacitive coupling to the bus
1084—exemplary or ideal bus signal, closest to signal representation directly output from bus before degradation
1086—degraded bus signal containing emissions coupled into it and modifying it typically insufficiently to change interpretation of digital bits
FIG. 6
1023—Antenna cable carrying free field emissions signal to 118
1090—LRU
3030—LRU and associated emissions
3002—LRU emissions
3006—LRU electronic card generating emissions
3008—intended, unintended, conducted and/or radiated emissions #1 from a PCB trace, component, interconnects, sockets, and/or connector
3010—emissions #2 from a PCB trace, component and/or connector, differing from 3008
3014—emissions #3 from a PCB trace, component and/or connector, differing from 3008 and/or 3010
3012—emissions #4 as a composite aggregation of emissions from LRU components, conducted thru the bus 1080, and emitted by bus
3060—Communications, power and/or external equipment interface for LRU. External equipment may comprise sensors, motors, engine electronics, actuators, solenoids, radar systems, communication systems, and the like
FIG. 8
802—Attack, benign, malignant, expected, or unexpected LRU change vector or means
804—detection of 802 event or status
806—communication established with component capable of responding to or mitigating new status
808—measures deploye3d including countermeasures if needed, typically somewhere in a component associated with or connected to bus or controlled by LRU, can be maintenance personnel
810—status change handled, adversary defeated, LRU problem mitigated, hot backup switchover, or other appropriate responses
FIG. 9
202—broad span high RBW representation of spectra containing emissions from several components combined in spectrum
204—narrow span low RBW magnification/enhancement of features of interest or significance found in 202 automatically by 100
206—narrow span low RBW magnification/enhancement of features of interest or significance found in 202 automatically by 100 of a separate region and potentially influenced by a separate device—containing detailed signature representing device status of a specific LRU component to be analyzed by system and potentially mitigated
208—exemplary emissions which may be originating from 8-bit microcontroller operations
210—exemplary emissions which may be originating from serial transceiver
212—exemplary emissions which may be originating from high density PLD or FPGA
FIG. 10
480—example emissions spectra from normal operation
490—example emissions spectra from an incursion attempt
482—example emissions spectra peak feature expected from normal operation
492, 494—example emissions spectra peak feature occurring during an incursion attempt
FIG. 11
502—example emissions spectra from unprogrammed part
504—example emissions spectra from programmed part with expected program
506—example emissions spectra from programmed part with unexpected program, malicious, or anomalous program
FIG. 12
602—example emissions spectra observed normally
604—example emissions spectra observed during reverse engineering attack
613—example added observable spectral features occurring during reverse engineering attack
FIG. 13
1302—exemplary spectrum generated as a result of program running encryption engine
1304—Exemplary spectrum generated as a result of program not running encryption engine or missing encryption engine
1306—added emission and spectral peaks generated by encryption engine
1308—emission features and spectral peaks generated by cpu and its operations absent a running encryption engine, typically containing less spectral content.

DETAILED DESCRIPTION OF EXEMPLARY EMBODIMENTS

Prior to proceeding to the more detailed description of the present subject matter, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As may be used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

References in the specification to "one embodiment", "an embodiment", "an exemplary embodiment", "another embodiment", "a presently preferred embodiment", "an alternative embodiment", "one variation", "a variation" and similar phrases mean that a particular feature, structure, or characteristic described in connection with the embodiment or variation, is included in at least an embodiment or variation of the subject matter. The phrase "in an embodiment", "in one variation" or similar phrases, as may be used in various places in the specification, are not necessarily meant to refer to the same embodiment or the same variation.

For purposes of description herein, the directional and/or relationary terms such as "upper", "top", "lower", "bottom", "left", "right", "rear", "back", "front", "apex", "vertical", "horizontal", "lateral", "exterior", "interior" and derivatives thereof are relative to each other and are dependent on the specific orientation of an applicable element or article, and are used accordingly to aid in the description of the various embodiments and are not necessarily intended to be construed as limiting. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The term "or" when used in this specification and the appended claims is not meant to be exclusive; rather the term is inclusive, meaning either or both.

The term "couple" or "coupled" when used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," and similar terms, as used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Anywhere the term "comprising" is used, embodiments and components "consisting essentially of" and "consisting of" are expressly disclosed and described herein."

The terms and words used in the following description and claims are not limited to the bibliographical meanings, but, are merely used by the inventor to enable a clear and consistent understanding of the subject matter. Accordingly, it should be apparent to those skilled in the art that the following description of exemplary embodiments of the present subject matter are provided for illustration purpose only and not for the purpose of limiting the subject matter as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Every electrical and electronic device necessarily sends Input and Output (I/O) signals and the generation of those signals and the signals themselves create unintended radiated emissions and unintended conducted emissions of a digital and analog nature as well as noise signatures. In addition, to signature creation in the conducted domain the electronics also gives off electromagnetic emissions that can be intended or unintended simply by operating or when being only powered on. The power that powers on the electronics can be external commercial power, battery power, aircraft power or internal power generation mechanisms. Thus, the signature of the conducted and electromagnetic emission given off is a property of any electronic device and furthermore can be used indirectly to determine and predict the state of the electronic device. By using multiple modes of measuring the signatures in multiple domains and combining that data with fault monitoring and bitstream monitoring of intended signals a powerful system for the detection of intrusion, cyber attacks, and cyber-physical attacks can be realized.

Term "unintended electromagnetic emissions of RF energy" or "unintended emissions" when used herein is intended to mean signals that are emitted by electrical and/or electronic devices and/or their components and that are often lie within the noise band. For example, such emissions can be from traces or wires on the printed circuit board coupled to a power source.

Term "signature" when used herein is intended to mean a constructed combination-construction of two or more components of a single artifact, two or more components of multiple artifacts or a single component of a single artifact.

The term "artifact" when used herein refers to its definition as "something observed in a scientific investigation or experiment that is not naturally present but occurs as a tangible and/or measurable result of the preparative or investigative procedure".

In other words, term "artifact" is intended to mean herein a characteristic that is generated by the device due to application or coupling of RF energy with highly specific frequency(s), amplitude, polarization, location, orientation, waveform and/or other characteristics to the device. Artifacts created may include, without limitation, component(s) such as EM wave, frequency feature, for example such as shift, nonlinear response, peak location, relative dB height, spacing(s) between peaks in a single emission, phase noise present, relationships, for example such as spacing(s) between peeks, in multiple unintentional frequency emissions arising and present, EM polarizations, etc. More specifically, the exemplary embodiments focus on frequency feature unintentionally (not intended by the manufacturer) generated and re-emitted due to illumination with RF energy. As an example, the peak location and relative dB height of new peaks appearing as a result of and far from a fundamental single illumination frequency would be derived and by-product of the design and constructions of the device and hence be considered a frequency artifact(s).

The term "threat" or "adversarial attack" when used herein refers, without limitation, to at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised said electronic systems connected to the data line, aged electronics, faulty electronics.

The particular embodiments of the present disclosure can be focused on emission of unintended electromagnetic energy and, more particularly, the emission of unintended electromagnetic energy being in a Radio Frequency (RF) spectrum, which is typically referred to in the art as frequencies below 300 GHZ, although infrared, infrasonic and other emissions are also contemplated by the exemplary embodiments.

The particular embodiments of the present disclosure generally provide apparatus and method directed to protecting avionics.

In an embodiment, an embedded avionics protection apparatus, that can be hereinafter referred to as "apparatus", 100 comprises a chassis, one or more printed circuit board assemblies mounted on the chassis, a power supply, an input/output assembly, a transceiver coupled to the input/output assembly, and a forced air conduction cooling fan. The one or more printed circuit board assemblies comprise one or more processor and a non-transitory computer readable medium comprising executable instructions that, when executed by the one or more processors, cause the one or more processors to perform required action steps.

Now in reference to FIG. 1, the embedded avionics protection apparatus 100 is described in a combination with an aircraft 1078, for example such as a military or a commercial aircraft. When the aircraft 1078 is of a military type, for example such as F-16C/D aircraft, critical avionics components are generally implemented as line replaceable units (LRU)s 1090 connected to a central data bus 1080, such as is defined by MIL-STD-1553B, to enable coordinated action and information sharing. The aircraft 1078 can further comprise a Multiple Function Display (MFD) component 1092 for the pilot sitting in the cockpit 1094 and Radar Antenna (RA) component 1098 as well as other avionics components. The loss or subversion of one or more of these components due to a successful intrusion attempt can jeopardize flight success and can lead to the unrecoverable loss of life or the entire aircraft due to loss of different tiers of electronic device functionality to include LRU or entire system functionality. Data bus 1080 does not have to comply with the MIL-STD-1553B in application that may not require such compliance.

Thus, in an embodiment, a network comprises a data bus 1080 comprising a pair of twisted wires 1004 encased in a shield 1003, electrical and/or electronic devices 1090 coupled to the data bus 1080 and the apparatus 100 being coupled to the data bus 1080 at least during operation off the apparatus 100, the apparatus 100 being configured to protect the electrical and/or electronic devices 1090 and/or an operation of the network from a threat thereto.

FIG. 2 illustrates an exemplary embodiment of the apparatus 100. The apparatus 100 can be configured as comprising a chassis 102, printed circuit board assemblies 104, 106, and 108 mounted on or inside the chassis 102, a power supply 110 mounted on or inside the chassis, an input/output assembly 112, a transceiver 120 coupled to the input/output assembly 112, and an optional forced air conduction cooling fan 124. The input/output assembly 112 comprises a member 120 that can be configured to be attached to and close one end of the chassis 102 and connectors 114, 116 and 118 extending from an exterior surface of the member 120. The connectors 114, 116 and 118 can be adapted with pins or sockets. The optional forced air conduction cooling fan 124, when provided, can close the opposite end of the chassis 102. If the optional forced air conduction cooling fan 124 is not provided, the opposite end of the chassis 102 can be closed with another member, for example being similar to the member 120 but without the connectors, or can be left open. Although the apparatus 100 has been illustrated in FIG. 2, as comprising three circuit board assemblies 104, 106, and 108, it can be configured with one, two or four or more circuit board assemblies.

FIGS. 3 and 4A illustrate a subset of the apparatus 100. More specifically, apparatus 100 is shown as comprising an electromagnetic pattern sensor or a sensor 820 and a controller 450 represented by time domain and/or frequency domain processing modules, 450A and/or 450B respectively, although either would provide needed discrimination functionality of varying capability and cost depending on the signature characteristics of the emissions radiated from the LRU(s) 1090. The components of the sensor 820 can populate or more of the circuit board assemblies 104, 106 and 108. The components of the time domain and frequency domain processing modules, 450A and 450B respectively, also populate one or more of the circuit board assemblies 104, 106 and 108. The controller 450 may be also a computer loaded with the required algorithms or any other controllers suitable for executing the instructions or logic algorithms.

The sensor 820 is configured to capture unintended emitted electromagnetic energy and/or unintended conducted energy from the LRU(s) 1090. When the sensor 820 is configured to capture unintended emitted electromagnetic energy from the LRU(s) 1090, the sensor 820 can includes a low noise amplifier (LNA) 834, an optional tuner 836 and analog to digital converter (ADC) 838. The optional tuner 836 may be of RF tuner type. The sensor 820 can be a general receiver or tuner and the general receiver can be a heterodyne or super-heterodyne receiver or equivalent. The sensor 820 can be improved by providing a broadband response. Though one embodiment focuses on emissions from about 100 KHZ to about 6 GHZ the bandwidth can be reduced to about 30 MHz to about 1 GHz to capture the majority of emissions from the devices coming in to the facility.

The sensor 820 and/or controller 450 may be also configured or provided as stand-alone device(s) remotely from the chassis 102. In an example, the controller 450 may be mounted within the cockpit 1094. In an example, the controller 450 may be mounted adjacent to the chassis 102 in a separate enclosure or chassis.

Further sensitivity is achieved by lowering the noise figure of the system. In an embodiment, the sensor 820 can comprise a modified front end with the Low Noise Amplifier (LNA) 834 with an ultra-low noise figure.

Each of the time domain and frequency domain processing modules, 450A and 450B respectively, comprises one or more processors or logic devices, for example such as general purpose processor(s) 402 and programmable logic device 406 that may be a FPGA. Some FPGAs have logic employing multiple states that each have their own decision trees which the FPGA typically periodically cycles between. An exemplary embodiment is configured to examine each of the states in more detail and with less effective unrelated noise from adjacent states by employing a means to synchronize acquisitions in the time domain with the different states or sensed states.

DSP integrated circuit(s) (IC) 404 and a single board computer 451 may be also provided. There is also a computational medium comprising algorithms and/or executable instructions that, when executed by the one or more processors or logic devices, cause the one or more processors or logic devices to perform, in one exemplary embodiment, the following steps on the captured unintended emitted electromagnetic energy and/or the unintended conducted energy: measuring a feature value in at least one spectral frequency region of the captured unintended emitted electromagnetic energy and/or unintended conducted energy from the one or more electrical devices, calculating a difference value between the measured feature value and a baseline feature value, and determining, based on the calculated difference value, a presence or an absence of anomalies indicative of at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised said electronic systems connected to the data line, aged electronics, faulty electronics.

An exemplary logic set of algorithms for comparing and matching the captured RF energy to a set of parameters identified for a baseline configuration of LRU(s) 1090 is best shown in FIG. 4 as the logic set 810. It would be understood that such logic set 827 is carried out by the at least one processor 402, though it also contemplates other hardware or firmware manifestations to assist or perform the comparison algorithms of verifying a match with the anticipated parameters such as Programmable logic device 406 or DSP IC 404.

The exemplary logic set 810 executes Fourier Transform 846 to convert the data in the digital filter 840 into the wavelet de-noise 847 for further processing in the subset 827. At least one and plurality of algorithms 848, 850, 852, 853 and 857 in the logic subset 828 are executed to match the data collected to the expected signature for the LRU(s) 1090. More than one algorithm may be used to match mutually exclusive parameters of the RF energy emission signature and then combine those using numerically weighted coefficients for each in a linear or nonlinear equation to yield a final overall score approximating the degree of match to an infected device. A fuzzy logic approach, neural network or other approach may be used to assist or replace this. In this manner the ability to match the collected signature to the expected signature is improved. The weighting of these algorithms favorably improves the ability to detect modified or unmodified parts. One key factor in determining the quality of signal fed into the overall system it the linearity, number of bits (Effective Number of Bits (ENOB)) and speed of the ADC 838 converting the raw analog time domain voltages into digital values for processing. A higher ENOB for example generates less noisy data resulting in more accurate and/or faster modified/unmodified determination decisions.

Thus, the exemplary logic set 810 can include at least one of Harmonic Analysis, Matched Filter, non-harmonic correlation, timing correlation, Artificial Neural Networks (ANN), specifically multilayer perception (MLP) feed-forward ANN with back propagation (BP), Wavelet Decomposition, Autocorrelation, Spectral Feature Measurements or Statistics, Clustering or Phase Detrending algorithms.

The configuration and/or operation of the apparatus 100 may be also in accordance with disclosures in the U.S. Pat. No. 7,515,094 and U.S. Pat. No. 8,063,813, both issued to Keller, III; in the U.S. Pat. No. 8,643,539 issued to Pauly on Feb. 4, 2014; and in the U.S. patent application Ser. No. 13/344,717 filed on Jan. 6, 2012 now published as US PUB. 2012-0179812 A1 on Jul. 12, 2012 and entitled "System and Method for Physically Detecting, Identifying, Diagnosing And Geo-locating Devices Connectable To A Network", all owned by the assignee of the instant invention and whose teachings are incorporated in their entirety herein by reference thereto.

The apparatus 100 may further comprise an antenna 1022 coupled to the sensor 820 and collecting the unintended emitted electromagnetic energy from the LRU(s) 1090.

The apparatus 100 may further comprise a graphic user interface (GUI) display 476 in a communication with one or both time domain and frequency domain processing modules, 450A and 450B respectively, for example through the single board computer 451.

An optional filter setting 837 may be also provided with a connection 839 to the programmable logic device 406. Filter setting 837 may be provided when strong interfering signals from LRU(s) 1090 or external components, for example such as antenna(s), must be compensated for. The embedded avionics protection apparatus 100 may further include fault monitoring equipment to include bitstream measurements, timing measurements, time domain reflectometry signal integrity measurements that are specifically intended to measure the electronic functionality of the data bus 1080 and LRUs 1090 or other electronics directly or indirectly connected to the data bus 1080.

In a further reference to FIGS. 1-2, the apparatus 100 may include inputs supporting acquisition of standard bus communications for a dual redundant data bus 1080 configuration in addition to dedicated interfaces for unintended common mode and differential mode conducted emissions. Outputs may include a transceiver line for direct communications to the primary and redundant data bus 1080 controller. These interfaces can be sufficient for in-flight monitoring and protection of LRUs connected to the data bus 1080. Additional inputs in the back of the chassis 102 can be intended to support depot-level/flight-line testing configuration where a portable ruggedized computer may be connected to monitor performance, undertake full test diagnostics, and/or may download additional data/results on identified threats 1076. The chassis 102 may be ruggedized to meet standard requirements, protected from environmental hazards and designed for use in an unpressurized environment. Design of operational specifications and performance parameters may be determined in coordination with aircraft manufacturer personnel to ensure seamless integration with existing requirements.

The core functionality of the apparatus 100 can be provided by a typically ultrasensitive RF sensor or receiver 820 that is configured to enhance, by orders of magnitude, the automated differentiation of ultra-low power emissions from LRU(s) 1090. This sensor 820 further may have substantial integrative processing assets to process system threats, and may be miniaturized into a single board, retaining sensitivity while enhancing its overall processing capabilities. This board may form the core of the system intrusion detection UNIT, providing the ability for real-time acquisition and analysis of unintended radiated and conducted emissions extracted from the data bus 1080 line.

An exemplary processing board within the apparatus 100 may process analog information attached to the data bus 1080 from connected LRU(s) 1090 under protection. Analog signals from conducted (differential and common mode) unintended emissions may be processed through dedicated Digital Signal Processing (DSP) 404 and Field Programmable Gate Array (FPGA) 406 assets for real-time detection of intrusion attempts and other cyber-physical threats. The apparatus 100 may include an additional dedicated board that will simultaneously handle the reception and analysis of digital traffic and communications over the aircraft bus, such as but not limited to the data bus 1080. This board may include substantial processing assets to include a dedicated FPGA that hosts Bus Monitoring or any other measurement, or advanced bus monitoring functionality that provides access to the raw data stream of data bus communications, which according to the MIL-STD-1553 specification typically may have a 1 MHz data rate though clearly monitoring of any data rate system is contemplated. Analysis of this data stream enables further means for targeted cyber-physical threat detection, enhancing results from unintended emissions analyses.

The apparatus 100 may be configured to perform digital and analog analyses on the incoming data stream to detect anomalies indicative of cyber physical threats. Threat detection may trigger communications sent to the data bus controller to take appropriate actions to mitigate loss of Critical Program Information (CPI) or spread of attack vectors to other LRUs in the aircraft 1078. This capability may form the core of the Intrusion Prevention System of the apparatus 100, and may ensure the integrity of aircraft platforms to enhance flight assurance. The apparatus 100 further enhances and integrates established bus monitoring functionality for automated LRU fault detection and prognostics. Bus monitoring digital analysis and fault monitoring blocks on the FPGA may be integrated with sensor fusion capabilities to facilitate automated combination of threat detection results from each system modality. The apparatus 100 in the form of an LRU or a larger system or subsystem may also host transceivers for communicating results to the data bus controller for intrusion prevention capabilities.

The apparatus 100 may be designed or configured to integrate multiple threat detection modalities for high reliability intrusion detection and prevention. Analog common mode and differential mode unintended emissions may be processed by dedicated boards, while digital and analog bus communication diagnostics may be handled by an additional dedicated board. The combination of results from each modality through sensor fusion algorithms provides high probability of threat detection with an extremely low false alarm rate. All processing may be performed in real-time within the system, requiring no access to external resources for diagnostics or decision making. Furthermore, the data can be ported offline for offline processing in some embodiments.

The apparatus 100 may connect, for example by using a MIL-STD-1553B bus specification, to a remote terminal, wherein the bus connection is drawn from a stub through a transformer. While this connection can be sufficient to support analysis of digital information and monitoring of faults across normal communication lines, the apparatus 100 may additionally leverage unintended emissions information from LRUs that has attached to the data bus or data line 1080. To access this information, the apparatus 100 may further comprise an analog data bus coupler or coupling device 1002, best shown in FIG. 5, as an integrated or a remotely positioned device. In other words, the apparatus 100 can be configured to receive and process conducted emissions 1072 carried through the data bus 1080 from LRU(s) 1090. The conducted emissions 1072 can be of common mode and/or differential mode. The conducted emissions 1072 could be intended or unintended.

In a further reference to FIG. 5, the analog (signal) data bus coupler 1002 comprises a housing 1005 that is configured to pass data bus 1080 through or otherwise being mechanically coupled to the data bus 1080. The data bus coupler 1002 is also electrically coupled to the data bus 1080 by way of an analog couple electronics 1006 for the possible acquisition of analog unintended emissions from the bus in several forms as attempted. In a first connection 1008, one possible form of analog signal is acquired as a common mode difference in voltage or a difference in common mode current flow between shield 1003 and data lines 1004. In a second connection 1012, a second possible form of analog signal is acquired as a voltage differential between two signaling data lines 1004, inductively coupled and through appropriately isolated resistors 1012A and isolating transformer 1012B to ensure impedance matching. In a third connection 1010, a third possible form of analog signal is acquired as an individual near field emission of the data lines 1004 or as a difference between near field emissions of the data lines 1004. In a fourth connection 1013, a fourth possible form of analog signal is acquired as a direct capacitive coupled signal acquisition means using capacitors 1013A and resistors 1013B to either provide impedance matching or preferably to provide very high impedance as an isolation to not affect the data bus 1080. In a fifth connection 1015, a fifth possible form of analog signal is acquired as a typically high impedance isolating output to reference the voltage differential between the data line 1004 and the shield 1003. All forms may offer differing emissions signals and hence any one, several or all may be implemented, depending on the depth of sophistication and analysis desired, as well as the characteristics of the LRU coupling to the bus in unanticipated manners. As the unintended emission, circuitry effects and cable run configurations and locations may vary from installation to installation and aircraft to aircraft, some experimentation may be desired to obtain specific signals of interest present at highest levels potentially in some best forms or combination of forms. The different forms may be added or subtracted together to further extract and enhance signals of interest, depending on the complex and often unpredictable coupling of the unintended emissions.

Analog Coupler Electronics 1006 are typically shielded and housed in a mechanically suitable enclosure 1005, the whole comprising the Analog Coupler 1002.

In an embodiment, a ground can be used instead of one of the differential input. Use of ground can reduce implementation cost.

Connections to the apparatus 100 from the signal connection lines 1008, 1010, 1012, 1013, and/or 1015 may typically go through a shielded cable into one of the connectors on the input/output assembly 112, for example such the connector 118.

These signals are then appropriately processed through means such as LNA 834, Tuner 836, and/or ADC 838 for conversion and or analysis by apparatus 100, such as conversion to the frequency domain using an FFT. Direct digital signal acquisition without a tuner is also envisioned herein, and digital downconversion may be performed inside a FPGA 406.

Although the data bus 1080 is typically located inside an aircraft, a lightning strike may be coupled to it, especially in a composite construction aircraft, therefore surge protection elements (not shown) may be deemed as necessary between conductors as is commonly known and practiced in the art.

The data bus coupler 1002 can deliver additional information critical to robust cyber-physical security and electronic health monitoring applications as contemplated. The data bus coupler 1002 may include dedicated hardware 1008, 1010, 1012, 1013 and 1015 capable of acquiring differential and common mode RF unintended emissions that are present on the data bus 1080.

FIG. 5 also illustrates that the apparatus 100 can be configured to receive and process/analyze emissions radiated from the same data bus 1080 and collected by the antenna 1022.

The data bus coupler 1002 can utilize a conductor current probe such as or similar to 1010 to capture radiated unintended emissions from each of the bus lines 1004 as well as the outer shield 1003. The probe is configured to focus on frequency ranges of greatest significance to CPS applications, which typically have been demonstrated to be the 1 MHz-3 GHz range. The data bus coupler 1002 may also include dedicated cabling to tie into the twisted pair 1004 in the data bus 1080 cabling to capture analog and digital information using standard data bus 1080 techniques that can be analyzed to support the Intrusion Detection system.

When the apparatus 100 is installed on the aircraft 1078, in addition to in-flight operations, performance testing in a maintenance or sustainment environment is an additional benefit of the subject matter including testing at a relevant aircraft manufacturer facility to capture performance data against selected LRUs of greatest concern to the aircraft manufacturer. The specific configuration may depend on the platform whose LRU(s) 1090 and data bus 1080 will be tested. The user of the apparatus 100 may undertake testing in the maintenance environment in the form of depot-level/flight-line tests. System test results may lay the groundwork for flight testing to further ensure system likelihood of continuous bug-free or threat-free operation.

The user may be the owner, the maintenance crew, the pilot, the bus manufacturer, the aircraft manufacturer or their personnel, or some third party entity who has responsibility for the protection and/or maintenance of the electronic systems connected to the data bus.

In an embodiment, the apparatus 100 can be configured to monitor analog information and also typically monitors digital information from LRU(s) 1090 connected, by way of the data bus coupler 1002, to the data bus 1080 to provide holistic protection and facilitate response and recovery actions.

When the apparatus 100 is installed on an aircraft 1078, the apparatus 100 can be configured to protect critical LRU(s) 1090, identified in coordination with aircraft manufacturer personnel, with additional LRUs being able to be added under subsequent technology refreshment iterations. The apparatus 100 may be configured for automatic detection of relevant threats and intrusion modes, with specific threats to be covered determined in coordination with the aircraft manufacturer based on the most recently available information regarding the threat-space. Development activities conducted may assess and verify system performance in an operational setting.

The apparatus 100 may be configured to identify and mitigate cyber-threats within avionics LRU(s) 1090 connected to the data bus 1080 through the monitoring of digital, analog, differential and common mode emissions. The apparatus 100 may integrate CPS technologies for intrusion detection, counterfeit and tampered component identification, and electronic health monitoring with BUS monitoring and arbitration capabilities for fault identification and diagnostics as well as advanced data stream analysis techniques.

In application on the aircraft 1078, specifications for Size, Weight, and Power (SWaP), system communications, interfaces, signal processing capabilities, sensor modalities, and environmental ruggedization may be derived from aircraft requirements for utilization of the system during flight. The apparatus 100 can be configured to support flight-line testing as an additional configuration. All modes may monitor protected LRUs through analysis of data bus 1080 emissions and communications. The LRU may combine bus monitoring capabilities for monitoring data bus 1080 communication faults with Electronic Health Monitoring technologies into a single integrated system.

In an embodiment, the apparatus 100 is configured to receive and process analog and digital information present on the data bus 1080 line to perform real-time threat detection for protected LRU(s) 1090. Acquisition of the analog information is typically achieved through a data bus coupling device 1002. The modified transformer 1012A, such as the one seen in the connection 1012, routes out each form of information on a separate cable to be connected to the monitoring apparatus 100. Digital communications may be routed to the apparatus 100 by direct tie into the bus line following MIL-STD 1553B specifications. Analog information collected via cable unintended common mode and differential mode emissions may be extracted through integration of non-interfering coupled current probes with standard transformer box hardware.

Coordinated Software Architecture for Simultaneous Monitoring and Threat Detection is a major benefit of the subject matter.

The apparatus 100 can simultaneously (or in parallel) monitor data bus 1080 emissions for cyber-physical threats, adversarial intrusion, fault detection and electronics health status. This capability is achieved through coordination of measurement results from common mode analog, differential mode analog, and digital information analysis subapparatus 100s of the subject matter. Sensor fusion is performed within embedded software within the subject matter, leveraging fusion algorithms that provide high Probability of Detection (Pd) and low False Alarm Rate (FAR).

The apparatus 100 includes hardware, firmware, or software and can select specific electronics to apply additional coordinated monitoring or select multiple LRU(s) 1090 and Threats of Interest. The user may target, using the subject matter, specific avionics LRU(s) 1090 of interest to the aircraft manufacturer due to the criticality of their functionality, intelligence regarding threats, and past history of anomalies and recurring repairable actions. The user may select several LRU(s) 1090 to include for protection and monitoring using the said apparatus. Known good and compromised versions of the LRU may be prepared and their unintended bus signal 1072, 3002B or 3002 spectrums compared to support characterization and performance enhancement for specific LRUs of interest to a user.

A non-exhaustive list of cyber and cyber-physical threats to be protected against and/or monitored for by the apparatus may include counterfeit electronics, maliciously modified electronic components, malware (software and/or physical), Rowhammer attacks, and intrusion attempts.

One or more of cyber-physical security algorithms for detection of counterfeit and subverted electronics through unintended emissions analysis can be implemented to automatically detect these exemplary threats by the subject matter. In addition, Cyber Physical Security (CPS) and EHM (Electronic Health Monitoring) can be integrated into a single unified architecture for simultaneous threat monitoring that forms a novel and sophisticated Intrusion Detection Apparatus 100 capable of simultaneously addressing multiple pertinent threats to avionics LRU(s) 1090.

Using this instant subject matter, the user of the subject matter may also manipulate a suite of configurable cyber-physical security algorithms for detection of counterfeit and subverted electronics through unintended emissions analysis. The user may leverage capabilities for CPS and EHM to be integrated into a single unified architecture for simultaneous threat monitoring to form a sophisticated Intrusion Detection Apparatus 100 capable of addressing pertinent threats to avionics LRU(s) 1090.

In an embodiment, software modules 450A, 450B for cyber-physical security as well as for electronic health monitoring may include algorithms for automated detection of counterfeit components, maliciously tampered electronics, and real-time detection of intrusion attempts that operate on analysis of unintended digital and analog emission signatures. CPS modules may be integrated into a single Intrusion Detection Apparatus 100 capable of reliably identifying pertinent threats to LRU(s) 1090 connected to the data bus 1080. These modules 450A, 450B may also be integrated with previously developed software to provide a more holistic assessment of LRU electronics status.

The data bus communications monitoring software utilized in one embodiment is integrated with the Intrusion Detection Apparatus 100 to enhance its capabilities. The enhanced Intrusion Detection Apparatus 100 simultaneously analyzes digital and analog information present on the data bus 1080 to detect anomalies indicative of threat vectors. In an embodiment, a sensor fusion architecture further improves the results of all sensed and measured inputs.

The CPS capabilities of the apparatus 100 can have the ability to detect intrusion attempts in real time through the monitoring of unintended emissions. One embodiment integrates the Intrusion Detection Apparatus 100 with a communications protocol capable of transmitting messages across the bus in response to attacks or abnormalities sensed on the data bus 1080 by the apparatus 100 to mitigate attacks. In the event that intrusion or other types of threat vectors are detected, the subject matter in one embodiment transmits a message to the data bus 1080 controller 1014 instructing the deployment of aircraft-defined countermeasures to protect LRU(s) 1090 under attack. The coordinated detection and response in one embodiment form an Intrusion Prevention Apparatus 100 by ensuring the integrity of powered avionics LRU(s) 1090 attached to the data bus 1080.

In an embodiment, optimization uses an understanding of expected digital and analog emission signatures to better detect anomalies indicative of threats to protected LRU(s) 1090. An embodiment acquires signatures for each of these modalities for identified LRU(s) 1090 of interest utilizing the apparatus 100. Initial or baseline exemplary assumed-good bus emission characterization may be performed using 1553-bus or other bus communications hardware to emulate as closely as possible the operational environment in which data acquisition will occur. Following characterization, signature files enabling automated detection of covered cyber-physical threats and intrusion attempts may be established for each LRU of interest.

In an embodiment, a test bed for acquisition of emission signatures for procured LRU(s) 1090 of interest is contemplated. Test configurations include the apparatus 100 connected to the LRU(s) 1090 of interest through the data bus 1080 using the data bus coupler 1002. Following test setup, another embodiment has the user acquire broadband digital and analog signatures for each LRU(s) 1090 of interest from 1002, 1022 using 1072, 3002, or 3002B. In an embodiment, multiple acquisitions may be performed over a range of expected conditions to enable determination of expected signature changes for normal operations of the LRU 1090 of interest. The range of conditions may include flight operations conditions or equipment conditions in applications not involving an aircraft data bus, but involving an industrial data bus in a manufacturing plant, or a similar data bus in a submarine or ship. Conditions may include temperature, acceleration, altitude extremes, EM/EMP attack, or atomic radiation or other stresses on the aircraft or structure housing the data bus. Real time condition status can be inputted into the apparatus 100, for example through a connection 114. Such status can be related to an external parameter, for example such as air temperature, pressure, battery level, etc.

In an embodiment, following signature acquisition, a user, for example such as a manufacturer's aircraft engineer, familiar with RF analysis can perform thorough analysis of emission signatures to identify changes indicative of threats of interest. The user can utilize software assets for automated and semi-automated signature analysis to facilitate quantitative differentiation of signatures for clean vs. compromised LRU(s) 1090. In this embodiment, this process results in the identification of multiple quantitative metrics indicative of LRU subversion, enabling high reliability threat detection during operation of the apparatus 100.

In an embodiment that enables fully automated threat monitoring, signature files are developed that define the expected signature behavior of properly operating and/or protected LRU(s) 1090. This embodiment defines tolerances for automated threat detection algorithms to target only anomalous signature changes indicative of intrusion attempts and other threat vectors. Developed signature files are implemented with the appropriate parameters into an embodiment that contains an embedded Signature Library to support automated testing and operation of the apparatus 100.

In an embodiment characterization and or testing of the aircraft and associated LRU(s) 1090 is performed while connected to the data bus 1080 of a grounded aircraft. The testing in this embodiment focuses on threat detection and electronics health monitoring of LRU(s) 1090 of interest included in prior characterization and assessment tasking.

In an embodiment, installation of the apparatus 100 includes apparatus set-up, proper connection to the data bus 1080 through customized transformer, GUI software operation definition, data interpretation, and the installation of the proper protocol for effective result reporting.

In an embodiment of the apparatus 100 instantiation, the signature characterization of the selected LRU(s) 1090 of interest is performed in an operational environment. In this embodiment signature acquisition is made when the LRU(s) 1090 of interest are connected to an operational data bus 1080. Signature files for automated threat detection may be updated where necessary to support further apparatus 100 instantiation or follow-on enhancement activities.

In addition to monitoring unintended emissions, one important embodiment includes the capacity to simultaneously analyze digital information sent over the aircraft bus line. The subject matter may integrate data bus 1080 monitoring capabilities, which effectively perform analysis of bus message data to detect and diagnose faults from avionics LRU(s) 1090, and have an available form factor that can be readily integrated with an aircraft based in-situ embodiment of the subject matter. Another embodiment includes further analysis of bus-collected data from bus communications by dedicated subject matter software modules to specifically detect anomalies indicative of cyber threats. Another embodiment further includes bus data analysis that enables prediction of failure prior to operational interruptions, enhancing the subject matters opportunities to mitigate threats.

Figure 7:
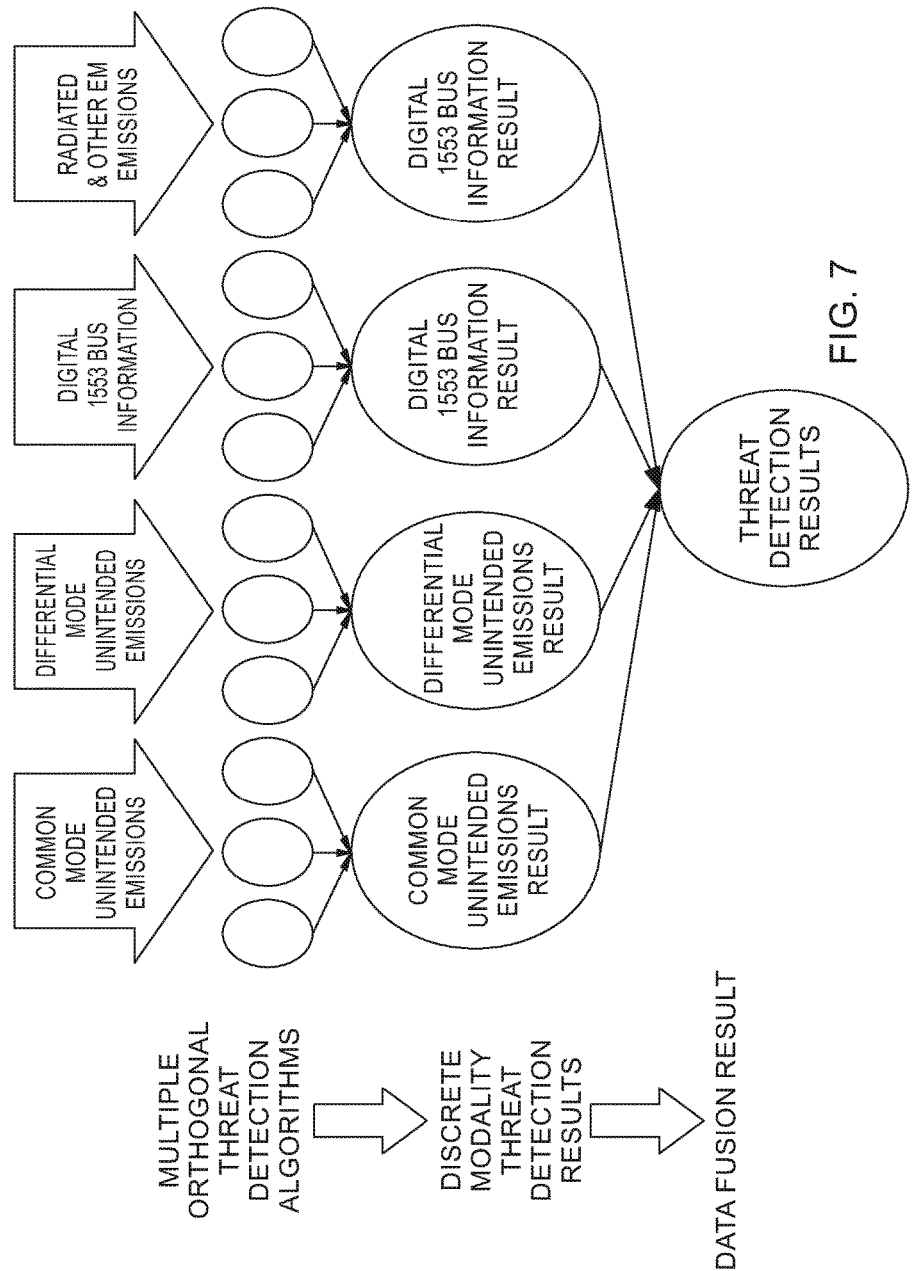
FIG. 7 illustrates Bayesian Network for Robust Threat Detection.

An embodiment combines threat detection results from analyses of common mode emissions, differential mode emissions, and digital data bus 1080 communications through proven sensor fusion techniques. In one exemplary embodiment, a Bayesian network such as seen in FIG. 7 that has been demonstrated successful in other cyber and cyber-physical threat detection applications and in other electronic health monitoring applications for this purpose by the inventors is utilized.

In an embodiment, the combination of results from multiple modalities significantly enhance aggregated Receiver Operating Characteristic (ROC) curve statistics, and hence the resulting probability of detection while minimizing false alarm rate, ensuring that results from the Intrusion Detection apparatus 100 exhibit the high confidence necessary for in-flight sensing operations.

Figure 8:
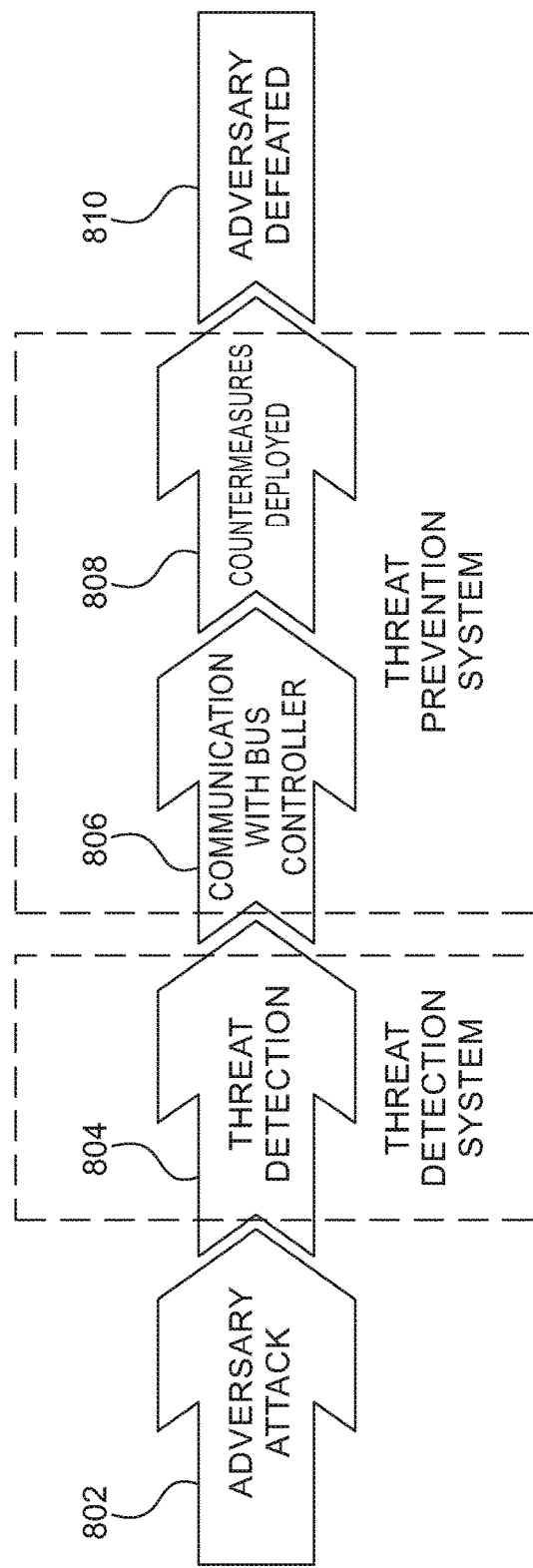
FIG. 8 illustrates an Intrusion Prevention System Concept of Operations (CONOPS)

In an embodiment, the Intrusion Prevention apparatus 100 operates mitigation procedures based on results from the Intrusion Detection apparatus 100 to ensure that adversarial attacks are unsuccessful. In an example, the apparatus 100 may instruct a suspect LRU 1090 to switch off, reboot, or switch over to a redundant unaffected hot spare backup. The Intrusion Detection apparatus 100 provides real-time situational awareness of ongoing cyber-physical threats to monitored LRU(s) 1090 throughout the aircraft. An exemplary Intrusion Prevention apparatus 100 CONOPS is shown in FIG. 8.

In an embodiment, upon detection and identification of the specific type of threat/intrusion, the apparatus 100 communicates with the bus controller to coordinate appropriate countermeasures to stop the adversarial attack. In another embodiment, the apparatus 100 communicates the nature of the threat vector as well as the LRU 1090 being targeted by the adversary to enable precision countermeasures defined by the user, aircraft manufacturer or other interested party to be taken manually, automatically or semi-automatically to defeat the attack. In another embodiment the capability integrates with a wide variety of countermeasures and signaling strategies based on relevant embedded capabilities.

The subject matter contemplates one or more of the following as exemplary representative intrusion prevention methods or approaches:

Upon threat detection, the apparatus 100 sends an optionally encrypted signal to the bus master using standard bus signaling. This may allow the bus controller to take appropriate actions, such as isolating or disabling the potentially compromised LRU and then restarting it.

Upon threat detection, the apparatus 100 that can, depending on the sensed threat, activate an out-of-band (OOB) network communication directly with the offending LRU, sending it a signal to activate internal countermeasures. Further contemplated, the subject matter may determine whether the threat is persistent and active during apparatus 100 startup or during a reset sequence prior to allowing the LRU back onto the main bus.

The apparatus 100 upon threat detection identified to be specific to a specific segment of the bus, may signal or command the bus controller to isolate compromised components.

An exemplary embodiment contemplates two primary configurations of the apparatus 100: an Intrusion Detection apparatus 100 and an Intrusion Prevention apparatus 100. The former focuses on the detection of adversarial intrusion attempts and other types of cyber-physical threats. The latter operates on detection results and provides a means to defeat adversary attacks prior to their success, protecting CPI and aircraft assets. The apparatus 100 may be connected to the aircraft data bus 1080 as a Remote Terminal (RT), and may receive analog and digital unintended and intended emissions and communications information from other LRU(s) 1090 attached to the data bus 1080 for remote monitoring of cyber-physical threats. Once an intrusion has been detected, the Intrusion Detection Apparatus 100 utilizes the aircraft data bus 1080 to mitigate or neutralize the threat. The subject matters typical exemplary Concept of Operations (CONOPS) is shown diagrammatically in FIG. 8.

In an embodiment, instantiation of firmware and software are supporting real-time threat detection that utilize FPGA, Digital Signal Processor (DSP) and PowerPC embedded apparatus 100 design. For analyzing signatures for anomaly detection, algorithmic assessment, and signature comparisons the apparatus 100 provides the capability to parametrically vary algorithmic variables without repeatedly testing targets in real time and facilitates rapid testing of new algorithms against existing signature and threat datasets. This embodiment of the apparatus 100 can use a true frequency resolution from 1 MHz to 0.01 Hz Resolution Bandwidth (RBW) over wide frequency spans. These spans in one embodiment cover 1 GHz of bandwidth. In other embodiments the span covered can be 3 GHz, 10 GHz or 100 GHz respectively. The acquisition of signature data over wide bands at high resolution in reasonable timeframes is contemplated as a means to increase overall apparatus 100 sensitivity and lower FAR.

An embodiment provides a Broadband Acquisition Apparatus 100 that can enable capture extremely high acuity of 1 billion data points in slightly over 1 hour, supporting detailed signature acquisition for targets of interest. Once the signature dataset is built from this data wide bandwidth continuous scans using this data can be returned to measure threats over various spectral regions in under a second.

All electronic components produce characteristic unintended RF emissions when powered, including those within avionics LRU(s) 1090 incorporated into aircraft. Emissions from each LRU can act as a fingerprint indicative of apparatus 100 functionality, programming, integrity, and electronic health status. Any adversarial intrusion attempt or cyber-physical attack will distinguishably alter the emission signature from the LRU.

The subject matter is capable of automatically detecting these indicative signature changes, enabling immediate detection and rapid response. Since unintended emissions are unique to the LRU, the adversary cannot counter the characteristic response that alerts the subject matter to an active attack. LRU emissions couple to the aircraft data bus 1080, enabling the sensing apparatus 100 to remotely monitor LRU status for anomalies indicative of cyber-physical threats by analyzing the analog and/or digital information content of the aircraft bus line.

The subject matter may provide cyber-physical security as a cross-cutting capability suitable for current and future aircraft apparatus 100s. Integration of the apparatus 100 into the aircraft 1078 may provide the aircraft 1078 with substantial benefits to enhance mission readiness and reduce the total ownership cost of fielded aircraft.

The apparatus 100, provided as an Intrusion Detection apparatus 100, leverages capabilities which may include real-time detection of adversary intrusion attempts, tampered components, maliciously modified programming, and counterfeit/degraded electronics. The apparatus 100 may simultaneously analyze intended and unintended emitted information from monitored LRU(s) 1090 to perform real-time threat detection. In parallel, the sensor apparatus 100 may analyze aircraft bus communications using fully integrated hardware, firmware, and software assets to acquire additional information on anomalous LRU faults indicative of cyber-physical threats. The integration of information gleaned from unintended emission signatures and standard bus communications enables the apparatus 100 to achieve high probability detection (PD) while retaining low FAR for threats of concern. The apparatus 100 may simultaneously receive data from each redundant aircraft data bus such as a data bus 1080, analyzed and matched for possible threat correlations, potentially visible with an analog emissions from data lines 1004, resulting in a higher detection confidence and may further offer the ability to take action if the primary bus controller of the aircraft 1078 itself is the target of the adversarial intrusion attempt.

The apparatus 100, configured as the Intrusion Prevention apparatus 100, may act upon detection results to mitigate adversarial activity. When a threat or intrusion attempt is detected, sensor apparatus 100 may direct coordinated action through the aircraft bus controller to deploy appropriate countermeasures.

The apparatus 100 may be configured to achieve the following:

Non-invasive acquisition of coupled unintended radiated and conducted emissions from the aircraft bus line to remotely monitor and protect all LRU(s) 1090 throughout the aircraft 1078

Provide access to over 1 GHz of bandwidth and enable real-time selective sensing and analysis from over 3 billion data points at high resolution. For example, access could be provided to about 3 GHz, 10 GHz, 100 GHz or more.

Suitability for integration with any aircraft utilizing a bus for inter-LRU communications, providing a cross-cutting solution with benefits across current and future aircraft apparatus 100s Combination of threat detection results from multiple analog and digital information sources, resulting in high probability of threat detection while retaining a low false alarm rate High confidence in results achieved by the apparatus 100 that enable the coordination of rapid response actions to detected intrusion attempts, preventing/mitigating their success and protecting the integrity of protected apparatus 100.

Perform EHM analysis on received analog and digital information sources from LRU(s) 1090 connected to the aircraft bus as a secondary function for additional value added to enable condition-based maintenance.

The apparatus 100, as an LRU itself, may provide benefits across the majority of currently supported aircraft platforms due to high reliance upon the aircraft bus on aircraft platforms. The benefits of an LRU intrusion detection and prevention apparatus 100 may be multi-fold including: (1) vulnerability identification and mitigation; (2) maintaining integrity and reliability of critical LRU apparatus 100s; (3) reducing risk of critical program information falling into adversarial hands; (4) verification of the trustworthiness of critical avionics embedded software and hardware; and (5) substantial maintenance-related cost savings. The robustness and versatility of apparatus 100 may reduce technical and programmatic risk on nearly every aircraft platform on which it is deployed.

The apparatus 100 may provide the user or manufacturer of the aircraft 1078 with an advanced, powerful real-time tool for the verification of the trustworthiness of hardware firmware and programming, while simultaneously monitoring avionics apparatus 100s for the occurrence of adverse apparatus 100 events, such as intrusions, tamper, electronic health status degradation, and anomalous communications. The ability of the apparatus 100 to monitor the functional characteristics of the aircraft bus operations and the unique, condition-based RF emissions of the LRU(s) 1090 on the bus may enhance the ability to identify and isolate potentially compromised and failing LRU(s) 1090. This capability may enhance in-flight operations and may improve identification of anomalies that would otherwise be categorized via post-flight diagnostics as a "No Fault Found" (NFF) or "Cannot Duplicate" (CND) through traditional Automated Test Equipment (ATE) testing. This may be an obvious enhancement to current aircraft capability, as it allows for in-the-fight vulnerability identification; mitigation and recovery as well as proactive maintenance actions to be taken that may reduce the incidences of faulty LRU(s) 1090 compromising apparatus 100 performance. This real-time monitoring approach enhances aircraft capability by ensuring that critical systems are constantly ready, reliable, and free of cyber threats such as malicious programming and hardware Trojans. This in turn, provides the additional benefit of improving the overall availability of aircraft, which currently averages in commercial aircraft availability rates, of 90%. Improving the availability of aircraft provides enhanced capability to deliver passengers and cargo and fly more complex flight paths with confidence in schedule fulfillment assurance.

Constant and active monitoring/protection of critical avionics systems through the apparatus 100 frees aircraft manufacturer resources that can be redirected towards system development, and overall capabilities enhancement, which inherently accelerates aircraft development. The ability of sensor system 100 to monitor degradation of LRU functionality/integrity while actively mitigating the effect of intrusions or other anomalies will allow for the more efficient allocation of scarce aircraft flight-ready assets while simultaneously enhancing depot level LRU assessments and efficiency to get systems back to flight-ready status thereby improving readiness levels.

The apparatus 100 may substantially reduce sustainment and maintenance costs by enabling targeted condition-based maintenance of LRU(s) 1090 that show faulty or anomalous behavior due to overt attack, subversion, aging, or other unforeseen malfunctions. The growth in complexity of electronic avionic systems has continued to increase aircraft total ownership cost. As of 2012, avionics systems represented an estimated 30 to 40% of civil aircraft purchase costs and more than 50% of military aircraft purchase cost.

The apparatus 100 may be configured and/or operable to constantly monitor the condition of critical avionics. This technology may significantly reduce Total Ownership Cost (TOC) of aircraft systems by providing a multi-fold cost reduction strategy:

1. Mitigation of costs associated with the breach or loss of CPI
2. Prevention and mitigation of overt and subversive attacks
3. Prediction of component failures irrespective of cause, enabling proactive and condition-based maintenance actions Cost reduction is directly related to the collection and analysis of system data for protection of LRU(s) 1090 connected to the aircraft data bus 1080 for cyber-physical security threats and intrusion attempts. This prevention produces cost savings in both the prevention of LRU maintenance resulting from threats and intrusion attempts, as well as costs associated with CPI breach, and the need for CPI redevelopment as a result of a successful intrusion event.

The apparatus 100 is configured with an inherent predictive element enabling value added capability of providing a new prognosticating capability related to the cyber and electronic health of avionics systems. The ability to detect anomalies in avionic LRU(s) 1090 benefit aircraft in-flight operations and support the activities of depot facilities, who will be better prepared for LRU replacements by having advanced warning of potential failures. In addition, since the apparatus 100 prognosticates failure based upon the unintended emissions of the device, characteristics directly related to its physical condition, this helps to prevent cycles of reported failures and NFF/CND testing currently prevalent in avionics servicing.

The apparatus 100 leverages unique unintended RF emissions from electronic systems to detect cyber-physical threats in real-time, enabling coordinated action to defeat adversarial attacks against aircraft systems. Emission signatures are characteristic to system and sub-system functionality, cyber-physical operation, electronics health status, and the particular programming being executed; any change to anticipated behavior results in immediate changes to these signatures, which can be detected in real-time to enable rapid response and recovery. Emission signature analysis provides a sophisticated and powerful tool for addressing the current aircraft fault monitoring needs for robust CPS of LRU(s) 1090 in current and future aircraft.

Figure 9:
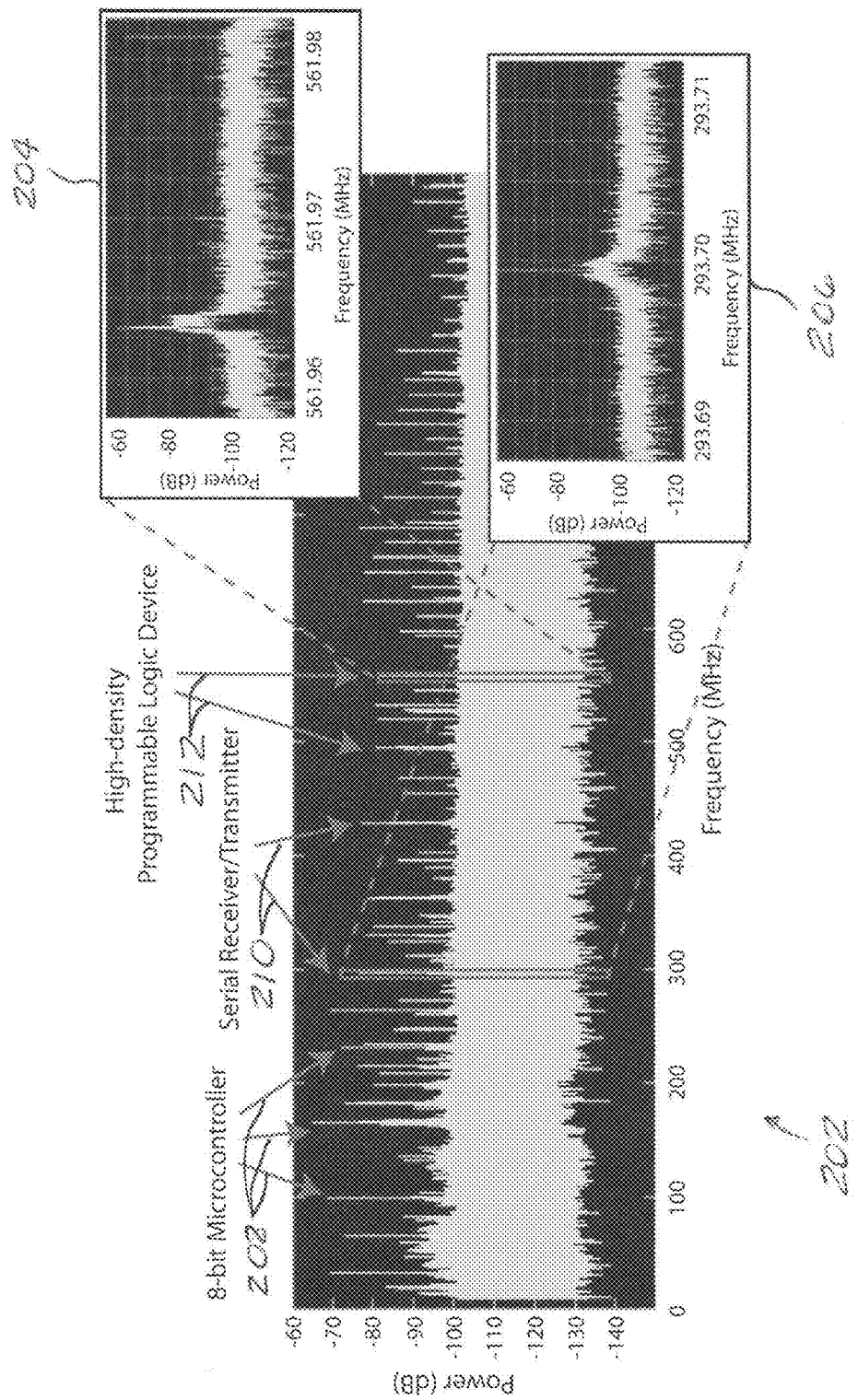
FIG. 9 illustrates an exemplary Unintended Emission Signature from Avionics Line Replaceable Unit (LRU)

All electronics produce unintended electromagnetic emissions when in operation that are typically causally related to the functionality, programming, and health status of the emitting electronics. LRU(s) 1090 in modern avionics are typically comprised of multiple circuit boards populated with discrete electronic parts that are robust emitters. Properly functioning LRU(s) 1090 unintentionally produce a myriad of unique characteristic emission signatures that may be necessarily distorted by cyber-physical threats and adversary intrusion attempts. An example signature from an avionics transceiver is shown in FIG. 9. The wealth of characteristic information present in each signature includes harmonic peak series, nonlinear products from emitted waveform mixing, attachment of phase noise and low frequency content to stronger emitted waveforms, and noise floor characteristics. Specifically, referenced are the emissions from critical microcontrollers, microprocessors, and programmable logic that may be specifically distorted during adversarial incursions and other types of cyber attacks.

LRU(s) 1090 connected to the bus, such as the data bus 1080, typically contain multiple electronic components that drive the functionality of the LRU or electronic system. During operations, these components may produce unintended radiated and conducted electromagnetic emissions that are especially robust in the RF range. These emissions may form a fingerprint-like signature that is specific to LRU configuration, electronic components used, electronic component status, and programming being executed. This emission signature may necessarily be altered by cyber-physical attacks, intrusion attempts, and anomalies in the functionality of the electronics. As such, detailed information on the current status and condition of LRU electronics may be determined through an analysis of the unintended emission signature of the LRU.

Despite even the best Electromagnetic Compatibility (EMC) designs, emissions from LRU electronics will attach to an exemplary bus communications line, enabling their detection by the apparatus 100 farther down the data bus 1080 by a highly sensitive sensor. LRU emissions attach to the data bus 1080 via both differential mode (voltage between the twisted pairs and/or the shield) and common mode (no voltage difference between pairs and shield, but current flows from LRU to LRU along the data bus 1080. The apparatus 100 may simultaneously, except for hardware and/or computational tolerances, or in a parallel arrangement analyze both differential mode and common mode emissions as they are inherently different, distinct, and may be independently exploited to glean information about the inner workings of LRU(s) 1090 connected to the bus. The attachment of this information to the data bus 1080 itself may enable the apparatus 100 to monitor and protect multiple integrated avionics LRU(s) 1090 simultaneously, except for hardware and/or computational tolerances, or in a parallel manner, through remote measurements made in an entirely different section of the aircraft. Cyber threats, for example from malicious programming modifications to adversarial intrusion attempts, may alter characteristic quantitative metrics of LRU emission signatures, enabling automated detection of sophisticated threats in actionable real-time.

Figure 10:
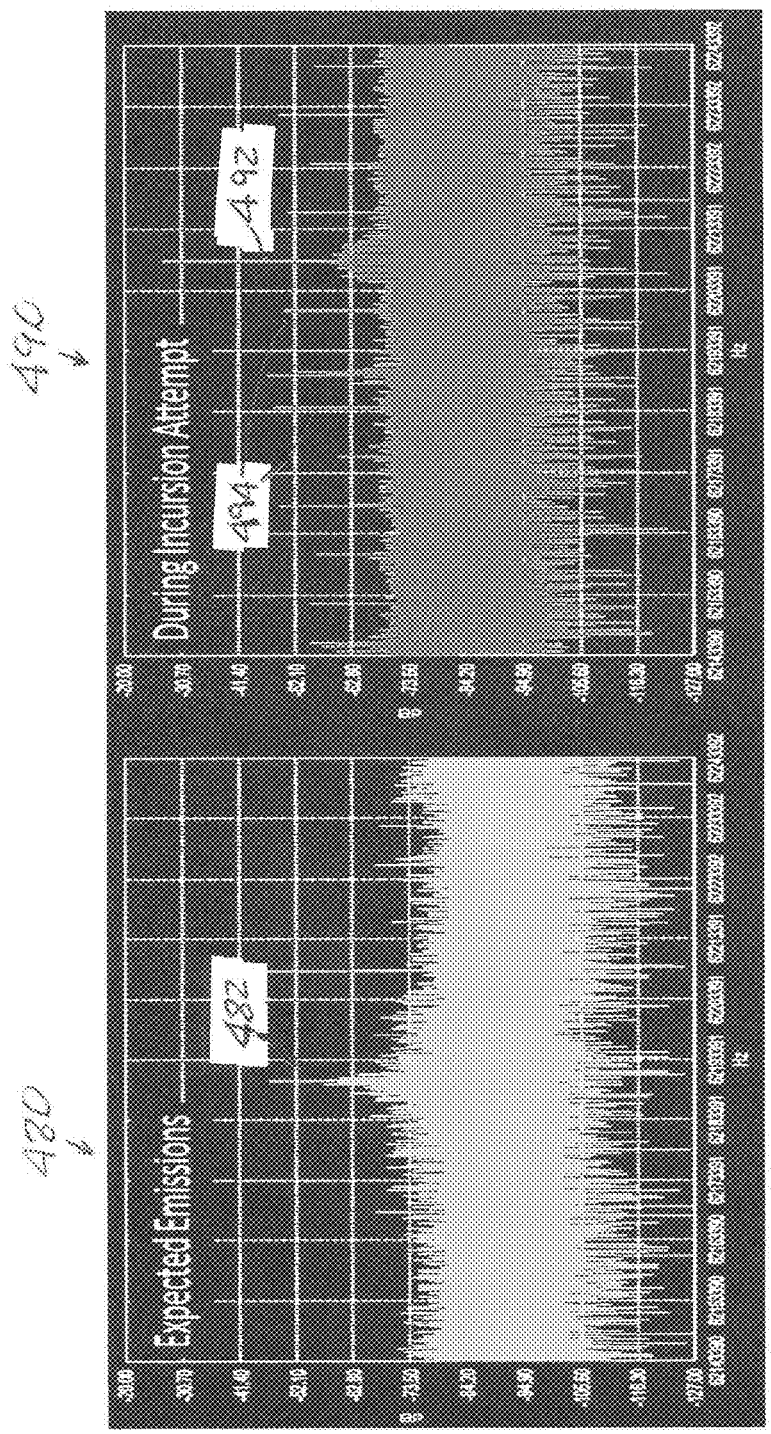
FIG. 10 illustrates exemplary Emission Signature Change during Intrusion Attempt.
Figure 11:
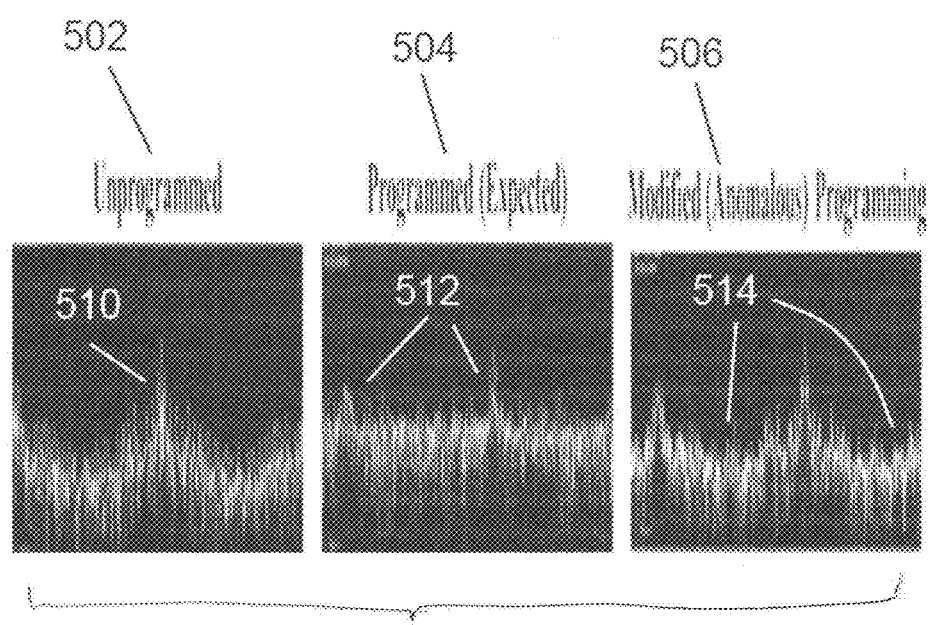
FIG. 11 illustrates exemplary Signature Differences for Malicious Programming Modifications.
Figure 12:
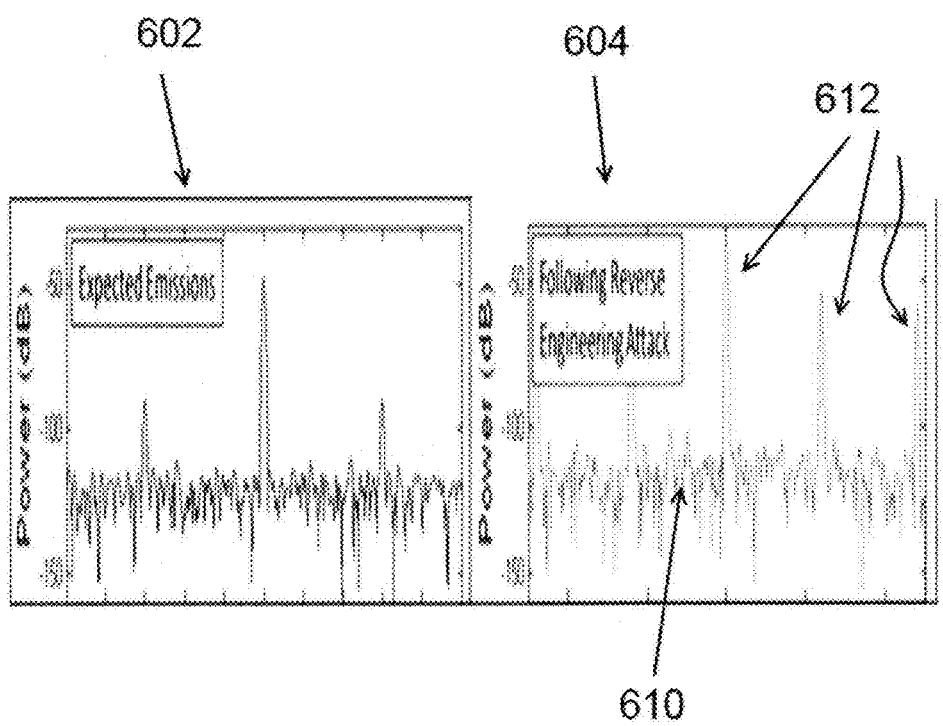
FIG. 12 illustrates exemplary Emission Signature Change due to Reverse Engineering Attempt.
Figure 13:
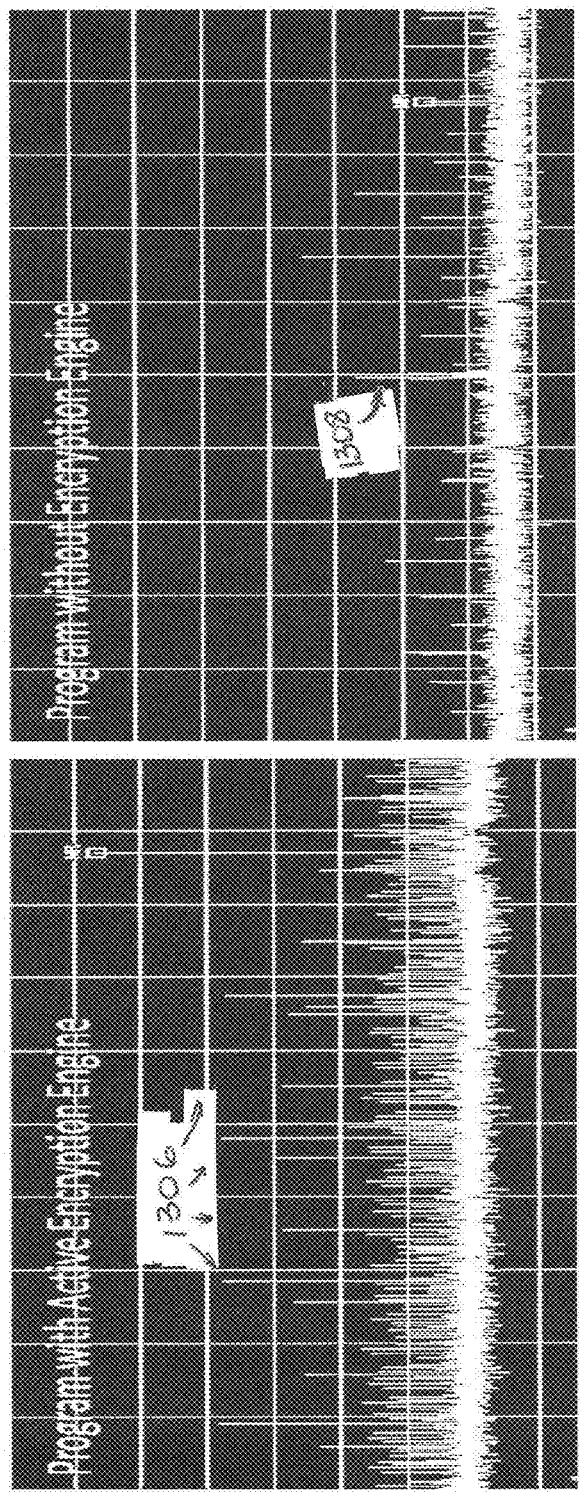
FIG. 13 illustrates Detection of the presence or absence of Active Encryption Engine operating within a program.

The sensor 820 of the apparatus 100 has been demonstrated as being capable of detecting a broad range of pertinent cyber-physical threats to avionics systems. The inventor has identified dramatic signature changes for different threat classes and specific threat vectors. FIG. 10 demonstrates how the emission signature for a complex programmable logic device may be modified during an incursion attempt. Malicious programming modifications may result in the addition or removal of key emission signature features, as shown in FIG. 11. FIG. 12 shows emission signature changes which may be caused by a Reverse Engineering (RE) attack on a trusted IC that could manifest on operational aircraft.

The apparatus 100 Intrusion Prevention system may be designed to maximize flexibility. Any circumvention, mitigation, and recovery mechanism that can be triggered may interface with apparatus 100 to maximize threat prevention and defeat. The apparatus 100 may additionally integrate or layer with a variety of intrusion mitigation and assessment systems to ensure that after/during mitigation the compromised LRU was no longer an internal threat.

The system may perform sophisticated cyber-physical security on fully assembled avionics systems, populated circuit boards, embedded firmware, and thousands of electronic piece parts. The system may be integrated into configurations onto Unmanned Aerial Vehicle (UAV) platforms as an LRU for sensitive RF signal acquisition and analysis or integrated into a ground based version of the sensor. The system may further be integrated into configurations onto Unmanned Underwater Vehicles (UUVs), land based vehicles, naval vessels, and into ground based facilities such as office buildings or military installations.

The system may be focused on real-time detection of adversarial intrusion attempts where the adversary sought to extract CPI from protected integrated circuits (IC). CPI and encryption key extraction techniques can take many forms, and are attacks in which the adversary uses information leakage in the form of electromagnetic, thermal, acoustic, or power fluctuations to gain access to protected information. The system may be configured to be capable of real-time detection of emission signature changes indicative of adversarial attempts, as shown in FIG. 6 for a programmable logic device during an intrusion attempt.

The apparatus 100 may be configured to detect electronic devices that have been tampered with and/or maliciously altered to subvert or change their functionality. The unintended RF emission signature from an electronic device is extremely sensitive to part integrity, die layout, and device functionality. The act of decapsulating the device for adversarial reverse engineering damages the circuitry enough to manifest as a distinct change in the emission signature. Further, modification of circuitry through Focused Ion Beam (FIB) editing causes dramatic signature changes due to an alteration of the current flow through the device. The system may detect these signature changes in real-time using its sensor and may leverage this capability to detect modified parts that surreptitiously are integrated into an aircraft LRU through means of a compromised supply chain. The apparatus 100 may be configured to rapidly and reliably detect multiple classes of counterfeit parts.

Detection of Malicious Programming Changes.

Software and firmware programs running on an electronic device directly affect its unintended emission signature. The specific current path and processing blocks used by the device differs for many programs, such as encryption engines, depending on if the current bit is a 0 or a 1. This results in a distinct difference to the emission signature that can be detected in real-time by the sensor. The ability to detect malicious programming changes through analysis of unintended emission signatures and detect Signature differences for malware are often dramatic and immediately apparent by the system, enabling real-time detection and response.

The apparatus 100 has achieved high accuracy in electronics health status determination for multiple types of LRU(s) 1090. Analytical techniques complement apparatus 100 threat detection capabilities, adding value to the implementation of the technology by enabling condition-based monitoring and maintenance for cost reduction.

The apparatus 100 has been successfully miniaturized in a sensor on a single board which can form a core of the apparatus 100 which may be miniaturized to a System-in-a-Package (SiP) and to an integrated System-on-a-Chip (SoC). Miniaturization and ruggedized apparatus may be used in onboard vehicles and aircraft, in land vehicles, UAVs, and unmanned rotorcraft.

The apparatus 100 may be configured to meet strict SWaP requirements onboard the platform and to maximize payload volume for additional sensors the system can be installed in a wing cavity using a LRU which could be rapidly replaced between flights. Other sensor inputs may include EMI, vibrational, and mechanical constraints, can be leveraged in the design of the apparatus 100 LRU under this program, significantly mitigating technical risks.

Results indicated that counterfeits could be effectively detected without the need for a "golden sample". The same phenomenology and detection modalities can be employed to provide CPS monitoring capability for LRU(s) 1090.

Instantiation of firmware and software supporting real-time threat detection by apparatus 100 may utilize FPGA, Digital Signal Processor (DSP) and PowerPC embedded system design, but is not limited to these. Software packages supporting application design and modification include but are not limited to Microsoft Visual Studio, Xilinx Vivado, MULTI, Ansoft Maxwell, HFSS, GEMACS, SuperNEC 1.53, MOMIC, MATLAB and MATHCAD.

For analyzing signatures for anomaly detection, algorithmic assessment, and signature comparisons the system provides the capability to parametrically vary algorithmic variables without repeatedly testing targets in real time and facilitates rapid testing of new algorithms against existing signature datasets. The apparatus 100 may use a true frequency resolution to 0.01 Hz RBW over wide frequency spans. The acquisition of signature data over wide bands at high resolution in reasonable timeframes is contemplated as a means to increase overall system sensitivity and lower FAR. The Broadband Acquisition System may enable capture of 1 billion data points in less than 1 hour, supporting detailed signature acquisition for targets of interest.

Electronics are vital to almost all modern systems. Bus systems or similar networked data line systems are used with near universality to distribute signals throughout systems. Where bus systems other modern interconnecting network technologies are used to connect systems, subsystems, boards or other electronic components together. The described apparatus 100 provides a means to protect any such systems from cyber and cyber physical attacks be those attacks software, firmware, network or hardware attacks. The described apparatus 100 provides a means to monitor electronic systems connected to the data bus or data line for electronic health monitoring and operational status determination to enable condition based maintenance.

All electronics produce characteristic unintended RF emissions when powered. These RF emissions are typically characterized as radiated or conducted and can take the form of digital or analog emissions. Some emissions are also intentional in that they are designed to have specific digital and analog waveforms. The described apparatus 100 leverages at least one of untended digital radiated, untended analog radiated, unintended digital conducted, unintended analog conducted, intended digital radiated, intended analog radiated, intended digital conducted and intended analog conducted emissions. Any number from one to eight of these modes of emissions can be utilized individually or in unison to provide intrusion detection. For each of these eight emissions modes both time domain and frequency domain emissions are used to monitor the status of the electronics being measured to prevent intrusion. In this manner 16-dimensional assessments can be made. Using modern computing assets all 16 spaces can be monitored simultaneously and in real-time.

In the case of critical aviation assets the described system is implemented as a stand-alone LRU or incorporated within avionics LRU(s) 1090 incorporated into aircraft. Emissions from each LRU act as a fingerprint indicative of system functionality, programming, integrity, and electronic health status. Any adversarial intrusion attempt or cyber-physical attack will dramatically alter the emission signature from the LRU. The apparatus 100 is capable of automatically detecting these indicative signature changes, enabling immediate detection and rapid response. Since unintended emissions are unique to the LRU, the adversary cannot counter the characteristic response that alerts the apparatus 100 to an active attack. LRU emissions couple to the aircraft bus, enabling the system to remotely monitor LRU status for anomalies indicative of cyber-physical threats by analyzing the analog and/or digital information content of the aircraft bus line.

An illustration of an exemplary apparatus 100 as an LRU and its typical specifications are shown in FIG. 2. The apparatus 100 may include inputs supporting acquisition of standard bus communications for a dual redundant data bus 1080 configuration in addition to dedicated interfaces for unintended common mode and differential mode conducted emissions. Outputs may include a transceiver line for direct communications to the primary and redundant data bus controller. These interfaces are sufficient for in-flight monitoring and protection of LRU(s) 1090 connected to the data bus 1080. Additional inputs in the back of the apparatus 100 are intended to support depot-level/flight-line testing configuration where a portable ruggedized computer may be connected to monitor performance of the apparatus 100, undertake full test diagnostics, and/or may download additional data/results on identified threats. The chassis 102 may be ruggedized to meet standard requirements, protected from environmental hazards and designed for use in an unpressurized environment. Design of the operational specifications and final Key Performance Parameters (KPPs) of the apparatus 100 may be determined in coordination with aircraft manufacturer personnel to ensure seamless integration with existing requirements.

The core functionality of the apparatus 100 as an LRU is provided by a typically ultrasensitive RF receiver that enhances by orders of magnitude the automated differentiation of ultra-low power emissions from electronics. This sensor further may have substantial integrative processing assets to process system threats, and may be miniaturized into a single board, retaining sensitivity while enhancing its overall processing capabilities. This board may form the core of the apparatus 100 LRU, providing the ability for real-time acquisition and analysis of unintended radiated and conducted emissions extracted from the data bus 1080 line.

The coupling device 1002 can be configured to deliver additional information critical to robust cyber-physical security and electronic health monitoring applications. The coupling device 1002 may include dedicated hardware configured to acquire differential and common mode RF unintended emissions that are present on the data bus or line 1080. A schematic diagram providing an overview of this configuration is shown in FIG. 5.

Develop Signature Files for Automated Threat Detection and System Performance Monitoring may be used to enable fully automated threat monitoring, the user may develop signature files that define the expected signature behavior of protected LRU(s) 1090. The user may define tolerances for automated threat detection algorithms to target only anomalous signature changes indicative of intrusion attempts and other threat vectors. Developed signature files will be implemented into an embedded Signature Library to support automated testing under test activities.

Initial testing of the apparatus 100 may be performed while connected to the data bus 1080 of a grounded aircraft 1078. The testing may focus on threat detection and electronics health monitoring of LRU(s) 1090 of interest included in prior characterization and assessment tasking.

Installation of the system may include system set-up, proper connection to the data bus 1080 through customized transformer, GUI software operation definition, data interpretation, and the proper protocol for effective result reporting.

As part of system instantiation activities, the users may perform signature characterization of the selected LRU(s) 1090 of interest in their operational environment. Results typically demonstrate robust signature acquisition when the LRU(s) 1090 of interest are connected to an operational data bus 1080. Signature files for automated threat detection may be updated where necessary to support further system enhancement activities.

The system may perform sophisticated cyber-physical security on fully assembled avionics systems, populated circuit boards, embedded firmware, and thousands of electronic piece parts.

The system may focus on real-time detection of adversarial intrusion attempts where the adversary sought to extract CPI from protected ICs. CPI and encryption key extraction techniques can take many forms, and are attacks in which the adversary uses information leakage in the form of electromagnetic, thermal, acoustic, or power fluctuations to gain access to protected information. The system may be configured to be capable of real-time detection of emission signature changes indicative of adversarial attempts, as shown in FIG. 11 for a programmable logic device during an intrusion attempt. This capability may be integrated into the apparatus 100 Intrusion Detection system.

The system has the ability to detect electronic devices that have been tampered with and/or maliciously altered to subvert or change their functionality.

The apparatus 100 can be designed to meet strict SWaP requirements onboard the platform and to maximize payload volume for additional sensors the system can be installed in a wing cavity using a LRU which could be rapidly replaced between flights. Other sensor inputs for integration into analysis and correlation include EMI, vibrational, and mechanical constraints, can be leveraged in the design of the LRU under this program, significantly mitigating technical risks. For example if excessive vibration is sensed, the flight control LRU's unintended emissions may be selected and may be especially scrutinized by the apparatus 100.

In an embodiment, an embedded avionic protection apparatus is configured to protect relevant avionics devices against threats of interest. A performance of the embedded avionic protection apparatus can exceed an objective Probability of Detection (Pd) of >90% with a False Alarm Rate (FAR) of <10%.

In an embodiment, an embedded avionic protection apparatus is configured as a powerful, vigilant, real-time tool for the verification of the trustworthiness of software and hardware, while simultaneously monitoring avionics devices or LRU(s) for the occurrence of adverse events such as intrusions, tamper, and unexpected behavior.

In an embodiment, an embedded avionic protection apparatus is configured to enhance aircraft capability through the real-time identification and mitigation of sophisticated cyber-physical threats, ensuring the integrity of critical LRU(s) 1090 and enhancing flight assurance. CPS monitoring may additionally enable the subject matter to assess electronic health status for proactive detection of compromised or faulty LRU(s) 1090. Further, the apparatus 100 may greatly accelerate aircraft development capability by ensuring that critical aircraft LRU(s) 1090 are not compromised by adversary malware, and that CPI is not breached or stolen by the adversary through malicious intrusion attempts.

In an embodiment, an embedded avionic protection apparatus is configured to substantially reduce sustainment and maintenance costs by enabling vulnerability identification, mitigation, response, and recovery of LRU(s) 1090 by targeting faulty or anomalous behavior that may be due to cyber-physical attacks and adversarial intrusion attempts.

In an embodiment, an embedded avionic protection apparatus is configured to provide a unique and unrivalled capability addressing the requirement to verify trustworthiness of LRU's on the aircraft bus through the integration of proven CPS technologies.

In an embodiment, the correctness emissions patterns can be typically been established with a baseline emission patterns previously while the system and LRUs are known to be operating normally.

In an embodiment, the apparatus 100 can be configured to health monitor its radiated emissions from internal components.

In an embodiment, an apparatus for a network of electrical and/or electronic devices coupled to a data bus comprises a sensor coupled to the data bus, the sensor configured to capture information content communicated through the data bus in a form of electromagnetic emissions being at least one of differential mode electromagnetic emissions, common mode electromagnetic emissions, coupled radiated electromagnetic emissions, and data bit streams; one or more processors or logic devices; and a non-transitory computational medium comprising executable instructions that, when executed by the one or more processors or logic devices, cause the one or more processors or logic devices to perform the following steps on the captured information content: measuring a feature value in at least one region of a time domain or a frequency domain of the captured electromagnetic emissions, calculating a difference value between the measured feature value and one or more baseline feature values, and determining, based on the calculated value, a presence or an absence of a threat to the network of electrical and/or electronic devices, the threat being of at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised the electronic systems connected to the data line, aged electronics, faulty electronics.

The non-transitory tangible computer readable medium and/or tangible computational medium may be a computer program 74. There is also a non-transitory storage medium (memory) 76 that stores such computer program 74.

Tangible computer readable medium means any physical object or computer element that can store and/or execute computer instructions. Examples of tangible computer readable medium include, but not limited to, a compact disc (CD), digital versatile disc (DVD), blu-ray disc (BD), usb floppy drive, floppy disk, random access memory (RAM), read-only memory (ROM), erasable programmable read-only memory (EPROM), optical fiber, etc. It should be noted that the tangible computer readable medium may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

Alternatively, it may be a plugin or part of a software code that can be included in, or downloaded and installed into a computer application. As a plugin, it may be embeddable in any kind of computer document, such as a webpage, word document, pdf file, mp3 file, etc.

In an example, the apparatus may further comprise an antenna coupled to the data bus and to the sensor and configured to collect the electromagnetic emissions.

In an example, the apparatus may further comprise the network with such data bus, wherein the network is installed in one of an aircraft, a naval vessel, a land vehicle, and a building.

In an example, at least one of the electrical and/or electronic devices is a circuit board or circuit assembly, comprising a plurality of electronic components and wherein the apparatus is configured to simultaneously or in parallel determined if the plurality of electronic components have the presence or the absence of the at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised the electronic systems connected to the data bus, aged electronics, and faulty electronics during operation of the apparatus.

In an example, the executable instructions, when executed by the one or more processors or logic devices, cause the one or more processors or logic devices to perform a spectrographic transform on the electromagnetic emissions.

In an example, the executable instructions, when executed by the one or more processors or logic devices, cause the one or more processors or logic devices to perform an additional step of analysis including at least one of a spectrographic analysis, time-frequency analysis, electromagnetic emission radiation response analysis related to data bit stream information content, a phase analysis, an informatics analysis, and a statistical analysis.

In an embodiment, an apparatus for analyzing at least one electrical device connected to a data bus can comprise a sensor configured to capture at least one of conducted electromagnetic emissions from the at least one electrical device, radiated electromagnetic emissions from the at least one electrical device that have coupled to the data line, and data bit streams from the at least one electrical device connected to the data line; one or more processors or logic devices; and a non-transitory computational medium comprising executable instructions that, when executed by the one or more processors or logic devices, cause the one or more processors or logic devices to perform the following steps on the captured electromagnetic energy and/or data bit stream: quantifying a feature value in at least one spectral frequency region of the conducted electromagnetic emissions and/or the radiated electromagnetic emissions and/or the data bit stream, identifying differences between the feature value and a baseline value, and analyzing quantitative differences to determine a presence or an absence of a threat to the at least one electrical device, the threat being at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised the electronic systems connected to the data bus, aged electronics, and faulty electronics during operation of the apparatus.

In an example, at least two different physical electrical devices can be connected to the data bus.

In an example, at least one of conducted electromagnetic emissions, radiated electromagnetic emissions, and data bit streams from the at least two different electrical devices connected to the data bus are captured simultaneously or in parallel by the sensor.

In an example, the executable instructions, when executed by the one or more processors or logic devices, cause the one or more processors or logic devices to perform an additional step of analyzing quantified values from the at least two electrical devices connected to the data line simultaneously to determine the presence or the absence of the threat being at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised the electronic systems connected to the data bus, aged electronics, and faulty electronics during operation of the apparatus.

In an example, the value of the parameter changes over time.

In an example, the value of the parameter differs across at least one of frequency domain, time domain, time-frequency domain.

In an embodiment, a network can comprises a data bus comprising a pair of twisted wires encased in a shield; electrical and/or electronic devices coupled to the data bus; an apparatus coupled to the data bus during use of the apparatus, the apparatus configured to protect the electrical and/or electronic devices and/or an operation of the network from a threat.

In an example, the apparatus can comprise a chassis; one or more printed circuit board assemblies mounted on the chassis; a power supply; an input/output assembly; a transceiver coupled to the input/output assembly; and a forced air conduction cooling fan.

In an example, the network can further comprise a coupling device operatively coupled to each of the data bus and the apparatus, the coupling device configured to acquire analog differential and common mode radio frequency (RF) unintended emissions present on the data bus.

In an example, the network can further comprise a coupling device coupled to each of the data bus and the apparatus, the coupling device comprising: a housing configured to pass the data bus therethrough; a first connection between pair of twisted wires and a data bus monitor, the first connection comprising an isolating transformer electrically connected to each of the pair of twisted wires and to a data bus monitor, and an isolating resister coupled mediate the isolating transformer and each of the pair of twisted wires; a second connection connecting the each of the pair of twisted wires with the apparatus; a third connection connecting the each of the pair of twisted wires with the apparatus and comprising an isolating resistor and a capacitor mounted in series therewith; and a fourth connection connecting the shied and the pair of twisted wires with the apparatus.

In an example, the threat is at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised the electronic systems connected to the data bus, aged electronics, and faulty electronics during operation of the apparatus.

In an example, the apparatus is configured to monitor information content on the data bus for a remote monitoring of the electrical and/or electronic devices connected to the data bus.

In an example, the information content comprises at least one of differential mode emissions, common mode emissions, radiated emissions, and a data bit stream on the data bus.

In an example, the apparatus is configured to monitor information content on the data bus for determining a status of the electrical and/or electronic devices, wherein the status defines a condition of the electrical and/or electronic devices for at least one of health monitoring, diagnostics and required maintenance actions.

In an example, the data bus comprises any one of vehicle data lines (i.e. 1553-bus), vessel data lines, aircraft data lines, building data lines (i.e. Ethernet).

In an example, the electrical and/or electronic devices comprise any one of a system, a subsystem, a board, and a single chip that is connected to the data bus.

In an example, the apparatus is configured to transmit results on the data bus or through other means (e.g. radio communications, communications through a different data bus).

In an example, the apparatus is configured to analyze the information content by quantifying feature values and comparing them to a baseline.

In an example, the apparatus is configured to transform data to time-domain, frequency-domain or time-frequency domain prior to quantifying feature values.

In an example, the apparatus is configured to apply machine learning algorithms to set one or more baseline feature values.

In an embodiment, a multimodal sensor system can comprise a plurality of sensing input forms including at least one signal form of untended digital radiated, untended analog radiated, unintended digital conducted, unintended analog conducted, intended digital radiated, intended analog radiated, intended digital conducted and intended analog conducted emissions; and wherein the sensed signal forms are used to provide information on at least one of intrusion detection, health monitoring, equipment operational status, equipment presence, Remaining useful life, operational mode, fault detection, software authenticity, software download in progress, and software change in progress.

In an example, the multimodal sensor system is configured to use the sensed signal forms to at least one of send a signal, log an event, reinitialize a device, or to control a device.

In an example, a control of the device comprises at least one of a redundant switchover, a disablement of the device, a alarm indication, a operator alert, a service request transmission, an isolation of the device, and an enablement of the device.

In an embodiment, a sensor system can be configured to sense signal forms originating in a bus common mode unintended emissions, bus differential mode unintentional emissions, and digital bus data, the sensor system is further configured to use signal forms to determine status, operational information, or configuration information related to devices connected to the bus. The sensor system can be further configured to employ a Bayesian network to fuse data from the signal forms to form an overall status result.

In an embodiment, a multimodal sensor system can comprise a plurality of sensing input forms including at least one signal form of unintended digital radiated, unintended analog radiated, unintended digital conducted, unintended analog conducted, intended digital radiated, intended analog radiated, intended digital conducted and intended analog conducted emissions; and the sensor input forms are used to provide information on at least one of intrusion detection, subversion detection, cyber threats, cyber penetration, health monitoring, equipment operational status, equipment presence, Remaining Useful Life (RUL), operational mode, fault detection, software authenticity, software download in progress, software change in progress and firmware changes in progress.

In an example, the multimodal sensor system can be further configured extract signals and/or signatures from a data bus.

In an example, the data bus comprises a MIL-STD-1553 data bus.

In an embodiment, a method of protecting electrical and/or electronic devices connected to a data bus from a threat, can comprise coupling an apparatus to the data bus; capturing, with the apparatus, information content communicated through the data bus in a form of electromagnetic emissions being at least one of differential mode electromagnetic emissions, common mode electromagnetic emissions, coupled radiated electromagnetic emissions, and data bit streams; measuring, with the apparatus, a feature value in at least one region of a time domain or a frequency domain of the captured electromagnetic emissions; calculating, with the apparatus, a difference value between the measured feature value and one or more baseline feature values; and determining, with the apparatus, based on the calculated value, a presence or an absence of the threat. The threat can be at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised the electronic systems connected to the data line, aged electronics, faulty electronics.

In an example, the method can further comprise fusing, with a Bayesian network, data from signal forms to form an overall status result.

In an example, the method can further comprise transmitting results on the data bus or through other means (e.g. radio communications, communications through a different data bus).

In an example, the method can further comprise analyzing the information content by quantifying feature values and comparing them to a baseline.

In an example, the method can further comprise transforming data to time-domain, frequency-domain or time-frequency domain prior to quantifying feature values.

In an example, the method can further comprise applying machine learning algorithms to set the one or more baseline feature values.

In an embodiment, a method of protecting electrical and/or electronic device(s) connected to a data bus from a threat, can comprise providing an apparatus comprising a sensor and a controller coupled to the sensor, the apparatus being configured to receive and process electromagnetic emissions being at least one of differential mode electromagnetic emissions, common mode electromagnetic emissions, coupled radiated electromagnetic emissions, free field electromagnetic emissions and data bit streams; providing a coupling device configured to acquire differential and common mode RF unintended emissions from the electrical and/or electronic device(s) that are conducted through the data bus; coupling the coupling device to the data bus; operatively connecting the coupling device to the apparatus; acquiring, with the coupling device, the differential and common mode RF unintended emissions; capturing, with the sensor, the acquired differential and common mode RF unintended emissions; processing, with the controller, the captured differential and common mode RF unintended emissions; and determining, with the controller, a presence or an absence of a threat to the electrical and/or electronic device(s).

In an embodiment, the above described method can further comprise coupling an antenna to the sensor; collecting, with the antenna, emissions of electromagnetic energy radiated from the data bus and/or from the electrical and/or electronic device(s); capturing, with the sensor, the radiated emissions collected at the antenna; and processing, with the controller, the radiated emissions captured at the sensor in a parallel relationship with processing the captured differential and common mode RF unintended emissions.

In an embodiment method of protecting electrical and/or electronic device(s) connected to a data bus from a threat can comprise providing an apparatus comprising a sensor and a controller coupled to the sensor, the apparatus being configured to receive and process electromagnetic emissions conducted through the data bus, the conducted emissions being at least one of differential mode electromagnetic emissions, common mode electromagnetic emissions, coupled radiated electromagnetic emissions, and data bit streams; providing a coupling device configured to acquire the conducted emissions; coupling the coupling device to the data bus; operatively connecting the coupling device to the apparatus; acquiring, with the coupling device, the conducted emissions; capturing, with the sensor, the acquired conducted emissions; processing, with the controller, the captured conducted emissions; and determining, with the controller, a presence or an absence of a threat to the electrical and/or electronic device(s).

In an embodiment, the above described method can further comprise coupling an antenna to the sensor; collecting, with the antenna, emissions of electromagnetic energy radiated from the data bus and/or from the electrical and/or electronic device(s); capturing, with the sensor, the radiated emissions collected at the antenna; and processing, with the controller, the radiated emissions captured at the sensor in a parallel relationship with processing the captured conducted emissions. Radiated emissions can be used for correlations of conducted analog signals or emissions. Digital signal can be used to direct analog analysis to a specific frequency region or artifact, for example to improve speed of operation or improve response time to a new condition.

The disclosed method(s) may be implemented in the form of software stored on a computer-readable non-transitory information storage medium such as an optical or magnetic disk, a non-volatile memory (e.g., Flash or ROM), RAM, and other forms of volatile memory. The information storage medium may be an internal part of the computer, a removable external element coupled to the computer, or unit that is remotely accessible via a wired or wireless network.

According to an exemplary embodiment, the processing member may be implemented as a computer program executed by a computer. For example, the processing member may take a form of a computer program containing one or more sequences of machine-readable instructions describing a method as disclosed above, or a data storage medium (e.g., semiconductor memory, magnetic or optical disk) having such computer program stored therein.

Computer program code for carrying out operations for aspects of various embodiments may be written in any combination of one or more programming languages, including an object oriented programming language, such as Java, Smalltalk, C++, or the like, and conventional procedural programming languages, such as the "C" programming language or similar programming languages. In accordance with various implementations, the program code may execute entirely in the apparatus, partly on in the apparatus, as a stand-alone software package, partly in the apparatus and partly on a remote computer or entirely on the remote computer or server. In the latter scenario, the remote computer may be connected to the processing member in the apparatus through any type of wireless or non-wireless network, including a local area network (LAN) or a wide area network (WAN), or the connection may be made to an external computer (for example, through the Internet using an Internet Service Provider).

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

According to a further exemplary embodiment, the computer may comprise a communication module comprising the receiving and/or transmitting members.

Persons of ordinary skill in the art may appreciate that, in combination with the examples described in the embodiments herein, units and algorithm steps can be implemented by electronic hardware, computer software, or a combination thereof. In order to clearly describe the interchangeability between the hardware and the software, compositions and steps of every embodiment have been generally described according to functions in the foregoing description. Whether these functions are performed using hardware or software depends on particular applications and design constraints of the technical solutions.

A person skilled in the art may use different methods to implement the described functions for each specific application. However, such implementation should not be considered as beyond the scope of the present invention.

Obviously, those skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. Thus, the disclosure is not limited to any particular combination of hardware and software.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module. The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that variations, modifications, equivalents and substitutions for components of the specifically described exemplary embodiments of the subject matter may be made by those skilled in the art without departing from the spirit and scope of the subject matter as set forth in the appended claims.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Any element in a claim that does not explicitly state "means for" performing a specified function, or "step for" performing a specified function, is not to be interpreted as a "means" or "step" clause as specified in 35 U.S.C. § 112, 6. In particular, any use of "step of" in the claims is not intended to invoke the provision of 35 U.S.C. § 112, 6.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present subject matter. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter are approximations, the numerical values set forth in the specific examples are reported as precisely as possible.

What is claimed is:

1. An apparatus for protecting electrical and/or electronic device(s) coupled to a data bus from a threat, the data bus comprising two differential signal lines within a shield, said apparatus comprising:
    a data bus coupler comprising one or more connections with at least one differential signal line, said one or more connections configured to acquire analog signal(s) conducted through the at least differential signal line;
    a sensor coupled to said data bus coupler, said sensor configured to capture said acquired analog signals;
    one or more processors or logic devices; and
    a non-transitory computational medium comprising executable instructions that, when executed by said one or more processors or logic devices, cause said one or more processors or logic devices to perform the following steps on said captured analog signals:
        measuring a feature value in at least one region of a time domain or a frequency domain of said captured analog signals,
        calculating a difference value between said measured feature value and one or more baseline feature values, and
        determining, based on said calculated value, a presence or an absence of said threat to the electrical and/or electronic devices.

2. The apparatus of claim 1, further comprising an antenna coupled to the data bus and to said sensor and configured to collect emissions of electromagnetic energy radiated form the electrical and/or electronic devices.

3. The apparatus of claim 1, wherein said electrical and/or electronic device(s) are installed in one of an aircraft, a naval vessel, a land vehicle, and a building.

4. The apparatus of claim 1, wherein said threat being of at least one of cyber intrusion attempt, cyber attack, cyber-physical attacks, malware, physical malware, tamper, malicious software, anomalous software, modified software, malicious firmware, anomalous firmware, modified firmware, malicious circuitry, anomalous circuitry, modified circuitry, cyber-physical attack, compromised said electronic systems connected to the data line, aged electronics, faulty electronics.

5. The apparatus of claim 1, wherein said executable instructions, when executed by said one or more processors or logic devices, cause said one or more processors or logic devices to perform a spectrographic transform on said captured analog signal(s).

6. The apparatus of claim 1, wherein said executable instructions, when executed by said one or more processors or logic devices, cause said one or more processors or logic devices to perform an additional step of analysis including at least one of a spectrographic analysis, time-frequency analysis, electromagnetic emission radiation response analysis related to data bit stream information content, a phase analysis, an informatics analysis, and a statistical analysis.

7. The apparatus of claim 1, wherein one connection from said one or more connections comprises a first connection portion with one of said two differential signal lines and a second connection portion with the shield, said one connection from said one or more connections is configured to acquire a common mode difference in voltage or a difference in common mode current flow between the shield and the two differential signal lines.

8. The apparatus of claim 1, wherein one connection from said one or more connections comprises connections with the two differential signal lines, resistors and a transformer, said one connection from said one or more connections acquires voltage differential between the two differential signal lines.

9. The apparatus of claim 1, wherein one connection from said one or more connections comprises connections with the two differential signal lines, said one connection from said one or more connections acquires an individual near field emission of the two differential signal lines or as a difference between near field emissions of the two differential signal lines.

10. The apparatus of claim 1, wherein one connection from said one or more connections comprises connections with the two differential signal lines, resistors and capacitors, said one connection from said one or more connections provides impedance matching.

11. The apparatus of claim 1, wherein one connection from said one or more connections comprises a first connection portion with one of said two differential signal lines and a second connection portion with the shield, resistors and capacitors, said one connection from said one or more connections acquires said analog signal as a high impedance isolating output to reference a voltage differential between the two differential signal lines and the shield.

12. A multimodal coupler system for a data bus with differential signal lines within a shield, comprising:
a plurality of analog sensing input forms comprising connection(s) with at least the differential signal lines, said analog sensing input forms including at least one of unintended digital radiated, unintended analog radiated, unintended digital conducted, unintended analog conducted, intended digital radiated, intended analog radiated, intended digital conducted and intended analog conducted emissions through the differential signal lines; and
wherein said analog sensing input forms provide information on at least one of intrusion detection, health monitoring, equipment operational status, equipment presence, remaining useful life, operational mode, fault detection, software authenticity, software download in progress, and software change in progress.

13. The multimodal coupler system of claim 12, wherein said multimodal sensor system is configured to use said sensed signal forms to at least one of send a signal, log an event, reinitialize a device, or to control a device.

14. The multimodal coupler system of claim 13, wherein a control of said device comprises at least one of a redundant switchover, a disablement of said device, an alarm indication, an operator alert, a service request transmission, an isolation of said device, and an enablement of said device.

15. A sensor system configured to sense analog signal forms originating in a bus common mode unintended emissions, bus differential mode unintentional emissions, and digital bus data, said sensor system is further configured to use said signal forms to determine status, operational information, or configuration information related to devices connected to said bus.

16. The sensor system of claim 15, further configured to employ a Bayesian network to fuse data from said signal forms to form an overall status result.

17. The multimodal sensor system of claim 16, further configured to extract signals and/or signatures from a data bus.

18. The multimodal sensor system of claim 17, wherein the data bus comprises a MIL-STD-1553 data bus.

19. A method of protecting electrical and/or electronic device(s) connected to a MIL-STD-1553 data bus from a threat, said MIL-STD-1553 data bus comprising differential signal lines, said method comprising:
providing an apparatus comprising a sensor and a controller coupled to said sensor, said apparatus being configured to receive and process electromagnetic emissions conducted through said differential signal lines in said MIL-STD-1553 data bus, said conducted emissions being at least one of differential mode electromagnetic emissions, common mode electromagnetic emissions, coupled radiated electromagnetic emissions, free field electromagnetic emissions and data bit streams;
providing a coupling device configured to acquire said conducted emissions;
coupling said coupling device to at least said differential signal lines in said MIL-STD-1553 data bus;
operatively connecting said coupling device to said apparatus;
acquiring, with said coupling device, said conducted emissions;
capturing, with said sensor, said acquired conducted emissions;
processing, with said controller, said captured conducted emissions; and
determining, with said controller based on processing of said captured conducted emissions, a presence or an absence of said threat to said electrical and/or electronic device(s).

20. The method of claim 19, further comprising:
coupling an antenna to said sensor;
collecting, with said antenna, emissions of electromagnetic energy radiated from said data bus and/or from said electrical and/or electronic device(s);
capturing, with said sensor, said radiated emissions collected at said antenna; and
processing, with said controller, said radiated emissions captured at said sensor in a parallel relationship with processing said captured conducted emissions.

21. An aircraft electronic device protection system, comprising:
a MIL-STD-1553 data bus comprising signal lines within a shield, said signal lines being coupled to one or more electronic devices within the aircraft;
a coupling device being coupled to at least said signal lines in said MIL-STD-1553 data bus, said coupling device acquires analog signal(s) conducted through said signal lines;
a sensor being coupled to said coupling device, said sensor configured to capture emissions of electromagnetic energy conducted from one or more electronic devices through said signal lines in said MIL-STD-1553 data bus; and
a controller coupled to said sensor, said controller being configured to process said conducted emissions of electromagnetic energy, and determine, based on processing of said captured conducted emissions of electromagnetic energy, a presence or an absence of a threat to the one or more electronic devices; and
said conducted emissions of electromagnetic energy being at least one of differential mode electromagnetic emissions, common mode electromagnetic emissions, coupled radiated electromagnetic emissions, free field electromagnetic emissions and data bit streams.

* * * * *